United States Patent
Li et al.

(10) Patent No.: US 12,438,639 B2
(45) Date of Patent: Oct. 7, 2025

(54) HYBRID AUTOMATIC REPEAT REQUEST HARQ-BASED COMMUNICATION METHOD AND APPARATUS

(71) Applicant: HUAWEI TECHNOLOGIES CO., LTD., Guangdong (CN)

(72) Inventors: Bin Li, Shenzhen (CN); Jiaqi Gu, Shenzhen (CN); Huazi Zhang, Hangzhou (CN); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/212,345

(22) Filed: Jun. 21, 2023

(65) Prior Publication Data

US 2023/0336273 A1    Oct. 19, 2023

Related U.S. Application Data

(63) Continuation of application No. PCT/CN2021/133967, filed on Nov. 29, 2021.

(30) Foreign Application Priority Data

Dec. 24, 2020 (CN) .......... 202011556770.6

(51) Int. Cl.
*H04L 1/00* (2006.01)
*H04L 1/1812* (2023.01)
*H04L 1/1822* (2023.01)

(52) U.S. Cl.
CPC .......... *H04L 1/0071* (2013.01); *H04L 1/1812* (2013.01); *H04L 1/1822* (2013.01)

(58) Field of Classification Search
CPC .... H04L 1/0071; H04L 1/1812; H04L 1/1822
See application file for complete search history.

(56) References Cited

U.S. PATENT DOCUMENTS

2004/0148552 A1* 7/2004 Matsumoto .......... H04L 1/0043
714/712
2010/0287437 A1* 11/2010 Dore ................. H03M 13/2972
714/752

(Continued)

FOREIGN PATENT DOCUMENTS

| CN | 102130757 A | | 7/2011 |
|---|---|---|---|
| CN | 104461921 A | * | 3/2015 |
| CN | 110890894 A | | 3/2020 |

*Primary Examiner* — Mark D Featherstone
*Assistant Examiner* — Jeffrey Andrew Yang
(74) *Attorney, Agent, or Firm* — WOMBLE BOND DICKINSON (US) LLP

(57) ABSTRACT

This application discloses a communication method includes: obtaining a plurality of information bits in first transmission; grouping the plurality of information bits into m groups of first information bit sequences $K_1, \ldots, K_m$; encoding the m groups of first information bit sequences to obtain a first target encoded codeword; sending the first target encoded codeword to a receive end; performing interleaving processing on n groups of first information bit sequences in the m groups of first information bit sequences in $t^{th}$ retransmission if the first transmission fails, to obtain m groups of first bit sequences $X_1, \ldots, X_m$; encoding the m groups of first bit sequences to obtain a second target encoded codeword; and sending the second target encoded codeword to the receive end. In this way, in a HARQ-based implementation, interleaving processing is performed on some information bit sequences in a retransmission process.

20 Claims, 12 Drawing Sheets

(56) References Cited

U.S. PATENT DOCUMENTS

| | | | |
|---|---|---|---|
| 2016/0277040 A1* | 9/2016 | Tong | H03M 13/356 |
| 2017/0019214 A1* | 1/2017 | Shen | H04L 1/0067 |
| 2019/0305881 A1* | 10/2019 | Jeong | H03M 13/6552 |
| 2019/0312602 A1* | 10/2019 | Li | H03M 13/658 |
| 2020/0274645 A1* | 8/2020 | Blankenship | H04L 5/0055 |

* cited by examiner

HYBRID AUTOMATIC REPEAT REQUEST HARQ-BASED COMMUNICATION METHOD AND APPARATUS

CROSS-REFERENCE TO RELATED APPLICATIONS

This application is a continuation of International Application No. PCT/CN2021/133967, filed on Nov. 29, 2021, which claims priority to Chinese Patent Application No. 202011556770.6, filed on Dec. 24, 2020. The disclosures of the aforementioned applications are hereby incorporated by reference in their entireties.

TECHNICAL FIELD

This application relates to the communication field, and in particular, to a hybrid automatic repeat request (HARQ)-based communication method and apparatus.

BACKGROUND

In the communication field, a bit error may occur in a digital signal during transmission due to external interference, fading, and the like, which further affects a transmission result of the signal.

Generally, transmission may be performed by using a hybrid automatic repeat request (HARQ) method. For example, when there is a decoding failure, a receive end stores a received signal and requests a transmit end to retransmit a signal, and the receive end combines the retransmitted signal and the previously received signal before decoding.

However, in the foregoing HARQ-based communication method, a signal is retransmitted only when there is a decoding failure at a receive end. Consequently, signal transmission performance cannot be improved, and a gain of channel coding cannot be fully explored.

SUMMARY

Embodiments of this application provide a HARQ-based communication method and apparatus. In a HARQ-based implementation, interleaving processing is performed on some information bit sequences in a retransmission process, and subsequent encoding and decoding operations are performed on interleaved sequences. Such interleaving processing can improve code weight distribution in transmission and provide better transmission performance, thereby obtaining a good coding gain.

According to a first aspect, an embodiment of this application provides a HARQ-based communication method, including: obtaining a plurality of information bits in first transmission; grouping the plurality of information bits into m groups of first information bit sequences $K_1, \ldots, K_m$, where m is a positive integer; performing first encoding on the m groups of first information bit sequences to obtain m groups of first encoded codewords; performing second encoding on the m groups of first encoded codewords to obtain a first target encoded codeword; sending the first target encoded codeword to a receive end; performing interleaving processing on n groups of first information bit sequences in the m groups of first information bit sequences in $t^{th}$ retransmission if the first transmission fails, to obtain m groups of first bit sequences $X_1, \ldots, X_m$, where n is less than m; t is greater than or equal to 1; and the m groups of first bit sequences include n groups of interleaved bit sequences; performing the first encoding on the m groups of first bit sequences to obtain m groups of second encoded codewords; performing the second encoding on the m groups of second encoded codewords to obtain a second target encoded codeword; and sending the second target encoded codeword to the receive end. In this way, in a HARQ-based implementation, interleaving processing is performed on some information bit sequences in a retransmission process, and subsequent encoding and decoding operations are performed on interleaved sequences. Such interleaving processing can improve code weight distribution in transmission and provide better transmission performance, thereby obtaining a good coding gain.

In an embodiment, the n groups of first information bit sequences include: n groups of information bit sequences corresponding to layers whose reliability ranks low in the m groups of first information bit sequences. The reliability ranks in descending order. In this way, the interleaving processing can ensure accuracy of transmitted information during transmission, thereby providing better transmission performance.

In an embodiment, an interleaving pattern of $X_m$ in the $t^{th}$ retransmission is different from an interleaving pattern of $X_m$ in $(t+1)^{th}$ retransmission. In this way, same or different interleaving patterns can be conveniently implemented by using same or different interleavers.

In an embodiment, the method further includes: performing interleaving processing on s groups of first information bit sequences in the m groups of first information bit sequences in the $(t+1)^{th}$ retransmission if the $t^{th}$ retransmission fails, to obtain m groups of second bit sequences, where s is less than m; and the m groups of second bit sequences include s groups of interleaved bit sequences; performing the first encoding on the m groups of second bit sequences to obtain m groups of third encoded codewords; performing the second encoding on the m groups of third encoded codewords to obtain a third target encoded codeword; and sending the third target encoded codeword to the receive end. In this way, interleaving processing is performed on some information bit sequences in a retransmission process, and subsequent encoding and decoding operations are performed on interleaved sequences. Such interleaving processing can improve code weight distribution in transmission and provide better transmission performance, thereby obtaining a better coding gain.

In an embodiment, when interleaving is performed on first information bit sequences at a same location in the $t^{th}$ retransmission and the $(t+1)^{th}$ retransmission, an interleaving pattern for performing interleaving processing on the first information bit sequence at the same location in the $t^{th}$ retransmission is different from an interleaving pattern for performing interleaving processing on the first information bit sequence at the same location in the $(t+1)^{th}$ retransmission. In this way, different interleaving patterns are used at a same location, so that more effective interleaving processing can be ensured, and code weight distribution in transmission can be better improved.

In an embodiment, when interleaving is performed on first information bit sequences at different locations in the $t^{th}$ retransmission and the $(t+1)^{th}$ retransmission, an interleaving pattern for performing interleaving processing on the first information bit sequence at one of the different locations in the $t^{th}$ retransmission is the same as or different from an interleaving pattern for performing interleaving processing on the first information bit sequence at the other of the different locations in the $(t+1)^{th}$ retransmission. In this way, a same interleaving pattern or different interleaving patterns are used at different locations, so that more effective interleaving processing can be ensured, and code weight distribution in transmission can be better improved.

According to a second aspect, an embodiment of this application provides a HARQ-based communication method, including: receiving, by a receive end, first to-be-decoded information in first transmission from a transmit end; determining first soft information based on the first to-be-decoded information; receiving, by the receive end, second to-be-decoded information in $t^{th}$ retransmission from the transmit end if the first transmission fails; determining second soft information based on the second to-be-decoded information; and performing, by the receive end, decoding processing on the first soft information and the second soft information through a cancellation operation and an AND operation based on an interleaving pattern. The first to-be-decoded information is related to a first target encoded codeword of the transmit end; the second to-be-decoded information is related to the second target encoded codeword of the transmit end; the first target encoded codeword is obtained by performing encoding processing on m groups of first information bit sequences; the second target encoded codeword is obtained by performing encoding processing on m groups of first bit sequences; the m groups of first bit sequences are obtained by performing interleaving processing on n groups of first information bits in the m groups of first information bit sequences; and n is less than m. In this way, in a HARQ-based implementation, interleaving processing is performed on some information bit sequences in a retransmission process, and subsequent encoding and decoding operations are performed on interleaved sequences. Such interleaving processing can improve code weight distribution in transmission, thereby obtaining a good coding gain.

In an embodiment, the n groups of first information bit sequences include: n groups of information bit sequences corresponding to layers whose reliability ranks low in the m groups of first information bit sequences. The reliability ranks in descending order.

In an embodiment, when interleaving is performed on first information bit sequences at a same location in the $t^{th}$ retransmission and the $(t+1)^{th}$ retransmission, an interleaving pattern for performing interleaving processing on the first information bit sequence at the same location in the $t^{th}$ retransmission is different from an interleaving pattern for performing interleaving processing on the first information bit sequence at the same location in the $(t+1)^{th}$ retransmission.

In an embodiment, when interleaving is performed on first information bit sequences at different locations in the $t^{th}$ retransmission and the $(t+1)^{th}$ retransmission, an interleaving pattern for performing interleaving processing on the first information bit sequence at one of the different locations in the $t^{th}$ retransmission is the same as or different from an interleaving pattern for performing interleaving processing on the first information bit sequence at the other of the different locations in the $(t+1)^{th}$ retransmission.

According to a third aspect, an embodiment of this application provides a HARQ-based communication apparatus, configured to perform the method in the foregoing aspects or any possible implementation of the aspects. In an embodiment, the apparatus includes units configured to perform the method in the foregoing aspects or any possible implementation of the aspects.

In an embodiment, the apparatus may include modules corresponding to performing the methods/operations/steps/actions described in the foregoing aspects. The modules may be hardware circuits, or may be software, or may be implemented by hardware circuits in combination with software.

In an embodiment, the apparatus is a communication chip. The communication chip may include an input circuit or interface configured to send information or data, and an output circuit or interface configured to receive information or data.

In an embodiment, the apparatus is a communication device. The communication device may include a transmitting machine configured to send information or data, and a receiving machine configured to receive information or data.

In an embodiment, the apparatus is configured to perform the method in the foregoing aspects or any possible implementation of the aspects. The apparatus may be configured in the transmit end or the receive end, or the apparatus is the transmit end or the receive end.

According to a fourth aspect, an embodiment of this application provides a HARQ-based communication apparatus, including a processor and a memory. The memory is configured to store a computer program. The processor is configured to call the computer program from the memory and run the computer program, so that the apparatus performs the method in any one of the possible implementations of the foregoing aspects.

In an embodiment, there are one or more processors, and there are one or more memories.

In an embodiment, the memory may be integrated with the processor, or the memory and the processor are disposed separately.

In an embodiment, the communication device further includes a transmitting machine (transmitter) and a receiving machine (receiver). The transmitting machine and the receiving machine may be disposed separately, or may be integrated together to be referred to as a transceiver machine (transceiver).

According to a fifth aspect, an embodiment of this application provides a communication system, including an apparatus configured to implement the method in the first aspect or any possible implementation of the first aspect, and an apparatus configured to implement the method in the second aspect or any possible implementation of the second aspect.

In an embodiment, the communication system may further include another device that interacts with the transmit end and/or the receive end in the solutions provided in embodiments of this application.

According to a sixth aspect, an embodiment of this application provides a computer program product. The computer program product includes: a computer program (which may also be referred to as code or instructions). When the computer program is run, a computer is enabled to perform the method in any one of possible implementations of the foregoing aspects.

According to a seventh aspect, an embodiment of this application provides a computer-readable medium. The computer-readable medium stores a computer program (which may also be referred to as code or instructions). When the computer program is run on a computer, the computer is enabled to perform the method in any one of possible implementations of the foregoing aspects.

According to an eighth aspect, an embodiment of this application provides a communication apparatus, including: a communication interface and a logic circuit. The logic circuit is configured to perform interleaving processing on n groups of first information bit sequences in m groups of first information bit sequences, and the communication interface is configured to send a first target encoded codeword and a second target encoded codeword, so that the communication apparatus performs the method in any one of possible implementations of the first aspect.

According to a ninth aspect, an embodiment of this application provides a communication apparatus, including: a communication interface and a logic circuit. The communication interface is configured to receive first to-be-decoded information and second to-be-decoded information, and the logic circuit is configured to perform decoding processing on the first to-be-decoded information and the second to-be-decoded information through a cancellation operation and an AND operation based on an interleaving pattern, so that the communication apparatus performs the method in any one of possible implementations of the second aspect.

DESCRIPTION OF EMBODIMENTS

Figure 1:
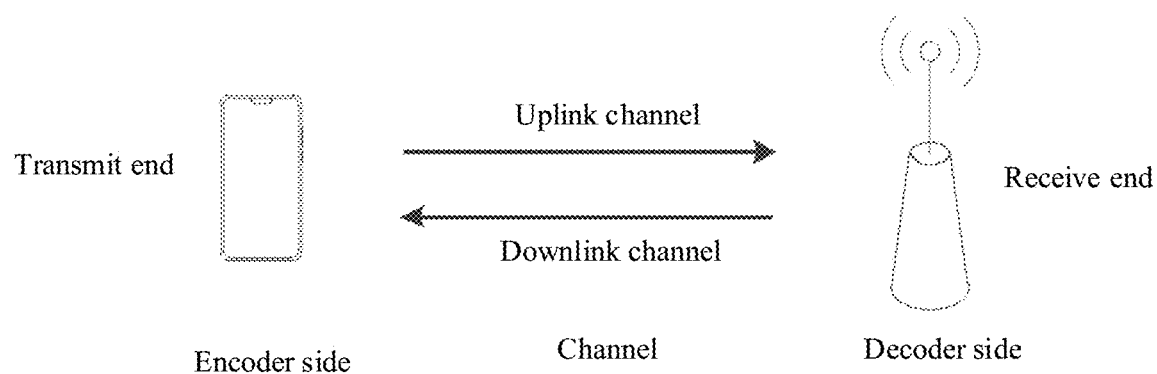
FIG. 1 is a schematic diagram of an architecture of a communication system according to an embodiment of the application.

To clearly describe the technical solutions in embodiments of this application, terms such as "first" and "second" are used in embodiments of this application to distinguish between same objects or similar objects whose functions and effects are basically the same. For example, a first value and a second value are merely used to distinguish different values, and a sequence of the first value and the second value is not limited. One of ordinary skilled in the art may understand that the terms such as "first" and "second" do not limit a quantity or an execution sequence, and the terms such as "first" and "second" do not indicate a definite difference.

It is to be noted that, in embodiments of this application, the word "example" or "for example" or the like represents giving an example, an illustration, or a description. Any embodiment or design scheme described as an "example" or with "for example" in embodiments of this application should not be explained as being more preferred or having more advantages than another embodiment or design scheme. Exactly, use of the word "example", "for example", or the like is intended to present a related concept in a In an embodiment manner.

In embodiments of this application, "at least one" means one or more, and "a plurality of" means two or more. The term "and/or" is an association relationship for describing associated objects and represents that three relationships may exist. For example, A and/or B may represent the following three cases: Only A exists, both A and B exist, and only B exists. A and B may be singular or plural. The character "/" generally indicates that the associated objects are in an "or" relationship. "At least one of the following items (pieces)" or a similar expression thereof refers to any combination of these items, including any combination of singular items (pieces) or plural items (pieces). For example, at least one of a, b, or c may represent: a, b, c, a-b, a-c, b-c, or a-b-c, where a, b, and c may be one or more.

Embodiments of this application may be applied to a wireless communication system. It is to be noted that, the wireless communication system mentioned in embodiments of this application includes, but is not limited to: a global system of mobile communication (GSM), a code division multiple access (CDMA) system, a wideband code division multiple access (WCDMA) system, a general packet radio service (GPRS), a long term evolution (LTE) system, an advanced long term evolution LTE-A (LTE advanced) system, an LTE frequency division duplex (FDD) system, an LTE time division duplex (TDD) system, a universal mobile telecommunications system (UMTS), a fifth generation mobile communication technology (5G for short) communication system, a new radio (NR) communication system, a future sixth generation mobile communication technology (6G for short) communication system, a Bluetooth system, a Wi-Fi system, a satellite communication system, a device-to-device (D2D) communication system, a machine communication system, the Internet of Vehicles, the Internet of Things, an even more advanced communication system, and the like.

A communication apparatus in embodiments of this application mainly includes a network device or a terminal device. In an embodiment of this application, a transmit end may be a network device, and a receive end is a terminal device. In an embodiment of this application, a transmit end is a terminal device, and a receive end is a network device.

In embodiments of this application, the terminal device includes but is not limited to a mobile station (MS), a mobile terminal, a mobile telephone, a handset, a portable equipment, and the like. The terminal device may communicate with one or more core networks through a radio access network (RAN). For example, the terminal device may be a mobile phone (or referred to as a "cellular" phone), a computer with a wireless communication function, or the like. Alternatively, the terminal device may be a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in transportation safety, an unmanned aerial vehicle, a wireless terminal in a smart city, a wireless terminal in a smart home, or the like. The terminal may be called with different names in different networks, such as user equipment, mobile station, subscriber unit, station, cellular phone, personal digital assistant, wireless modem, wireless communication device, handheld device, laptop computer, cordless phone, or wireless local loop station. For ease of description, the terminal is referred to as a terminal device in this application.

In embodiments of this application, the network device may be a device configured to communicate with the terminal device. For example, the network device may be a base station (BTS) in a GSM system or a CDMA system, or may be a base station (nodeB, NB) in a WCDMA system, or may be an evolved base station (evolutional nodeB, eNB or eNodeB) in an LTE system, or a transmission reception point (transmission reception point, TRP) or a next generation nodeB (gNB) in a new radio (new radio, NR) network. Alternatively, the network device may be a satellite, a relay station, an unmanned aerial vehicle, an access point, an in-vehicle device, a wearable device, a network side device in a 5G network, a base station, a network device in a future evolved public land mobile network (PLMN), or a network device in a network in which a plurality of technologies are converged. It is to be noted that, when the solutions in embodiments of this application are applied to another system that may appear in the future, names of the base station and the terminal may change. However, this does not affect implementation of the solutions in embodiments of this application.

In a communication scenario in embodiments of this application, a channel encoding and decoding technology for improving information transmission reliability and ensuring communication quality may be applied to a scenario in which information is encoded and decoded, for example, may be applied to a scenario in which uplink control information and downlink control information of enhanced mobile broadband (eMBB) are encoded and decoded, or may be applied to another scenario, for example, channel coding, uplink control information, downlink control information, and a channel coding part of a Sidelink channel in the communication standard TS 36.212 5.1.3. This is not limited in embodiments of this application.

Embodiments of this application are not only applicable to wireless communication, but also applicable to a series of application scenarios that require encoding and decoding, such as wired communication and data storage. For scenarios to which embodiments of this application are applicable, details are not described herein again in an embodiment.

For example, FIG. 1 is a schematic diagram of an architecture of a communication system according to the application. As shown in FIG. 1, the communication system in an embodiment of the application may include a transmit end and a receive end.

In an embodiment, when the transmit end is a terminal device, the receive end is a network device. When the transmit end is a network device, the receive end is a terminal device.

The transmit end may also be referred to as an encoder side. The transmit end includes an encoder. The transmit end may perform encoding by using the encoder, and transmit an encoded sequence to the receive end through a channel.

The receive end may also be referred to as a decoder side. The receive end includes a decoder. The receive end may decode a received sequence by using the decoder.

As shown in FIG. 1, when the transmit end is a terminal device and the receive end is a network device, a channel used for the transmit end to send information to the receive end may be referred to as an uplink channel, and a channel used for the receive end to send information to the transmit end may be referred to as a downlink channel. The transmit end may encode the information before sending the information, and send encoded information to the receive end. If there is a decoding failure at the receive end, retransmission may be implemented based on HARQ.

It is to be noted that, FIG. 1 merely illustrates an architectural diagram of a communication system in an example, but does not limit the architectural diagram of the communication system.

Figure 2:
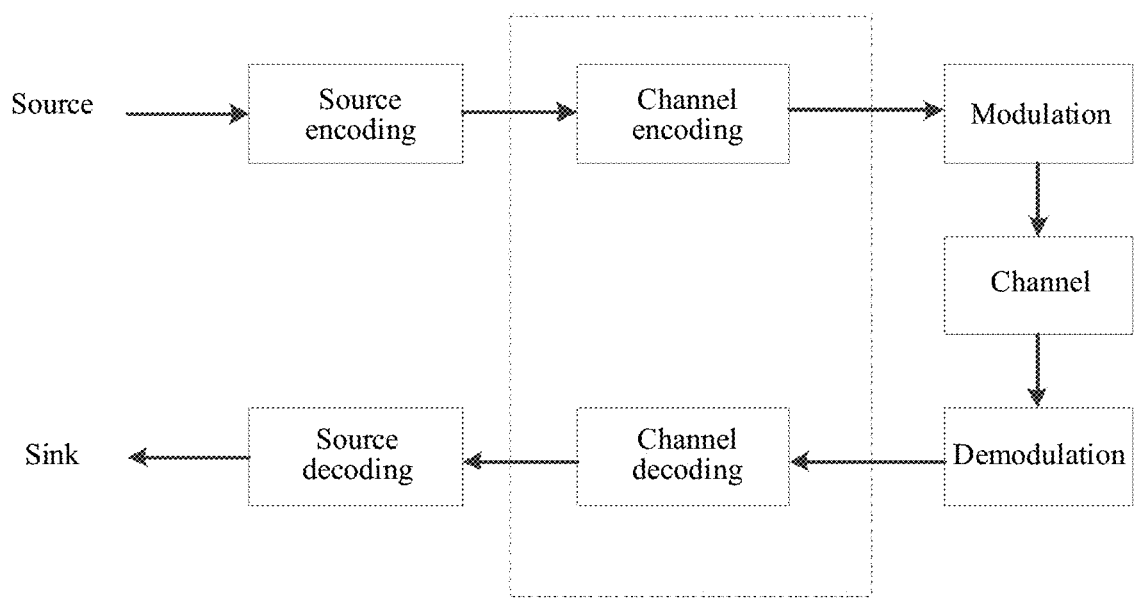
FIG. 2 is a schematic flowchart of information transmission according to an embodiment of the application.

For example, FIG. 2 is a schematic flowchart of information transmission according to an embodiment of this application.

As shown in FIG. 2, at a transmit end, a source is transmitted on a channel sequentially through source encoding, channel encoding, and modulation. At a receive end, a sink is outputted sequentially through demodulation, channel decoding, and source decoding.

At the transmit end, source encoding may be a process of converting an analog signal into a digital signal by performing source conversion or processing to reduce or eliminate source redundancy. Channel encoding may be a process of improving an anti-interference capability and an error correction capability of a source by increasing redundancy to resist noise and attenuation in a channel. Modulation may be a process of processing and adding a source to a carrier to change the source into a form suitable for channel transmission. Modulation may be a process of changing the source with a signal amplitude by changing a high-frequency carrier or changing an amplitude, phase, or frequency of a carrier signal of a message.

At the receive end, demodulation, corresponding to modulation, may be a process of extracting a signal from a carrier for sink processing and understanding. Channel decoding, corresponding to channel encoding, may be a process of restoring a signal. Source decoding, corresponding to source encoding, may be a process of converting a digital signal into an analog signal.

For example, in a process of information transmission, the transmit end performs source encoding and channel encoding on a source (which may also be referred to as an information bit sequence, a to-be-encoded bit sequence, or to-be-sent information) to obtain an encoded bit sequence (which may also be referred to as an encoded codeword). The encoded bits are modulated and transmitted on the channel to the receive end. The receive end demodulates the received encoded bit sequence to obtain a to-be-decoded bit sequence. The receive end performs channel decoding and source decoding on the to-be-decoded bit sequence to obtain a sink (which may also be referred to as a decoded information bit sequence, a decoded bit sequence, or decoded information).

Currently, a polar code or a Reed-Muller (RM) code is a common coding scheme in a mobile communication system.

A polar code is a known channel coding scheme that can be proved to reach a channel capacity, and has characteristics such as high performance, low complexity, and flexible matching manners. Currently, this solution has been determined by 3GPP as a control channel coding scheme in a 5G control channel eMBB scenario (uplink/downlink).

An encoding process of the polar code is $x=u \cdot F_n$. In this formula, u is a binary vector whose length is n, and $F_n$ is a Kronecker transformation matrix and is also a generator matrix G of the polar code.

$$F_n = \begin{bmatrix} 1 & 0 \\ 1 & 1 \end{bmatrix}^{\otimes n}$$

is a Kronecker product of n matrices $$\begin{bmatrix} 1 & 0 \\ 1 & 1 \end{bmatrix}.$$

The code generated by this method is polarized. The polar code may be decoded based on a successive cancellation (SC) decoding algorithm, a successive cancellation list (SC list, SCL) decoding algorithm, or the like.

An RM code is also a common channel coding technology. A fast decoding algorithm of the RM code is applicable to an optical fiber communication system.

If parameters r and m are given, and r≤m, an RM code of order r may exist and may be expressed as: (r, m). A codeword length (or referred to as a code length) is $N=2^m$, a minimum code distance is $d=2^{m-r}$, and a quantity of information bits is $$K = \sum_{i=0}^{r} \binom{m}{i}.$$

Therefore, the RM code may also be expressed as: (N, K, d).

The RM code may be constructed by using a same N×N matrix $$G = \begin{bmatrix} 1 & 0 \\ 1 & 1 \end{bmatrix}^{\otimes n}$$

as the polar code, but standards for selecting information bits are different. When the RM code is constructed, a weight of a row in the matrix G corresponding to each bit may be calculated, then a bit with a large weight is used as an information bit, and a bit with a small weight is used as a frozen bit, which is usually set to 0.

In the process of information transmission shown in FIG. 2, if there is a decoding failure at the receive end, retransmission may be implemented based on HARQ.

HARQ may be a technique formed by combining forward error correction (FEC) coding and auto repeat request (ARQ). A HARQ-based communication method may be as follows: When there is a decoding failure at the receive end, the receive end may transmit a negative-acknowledgment (NACK) message to the transmit end through a feedback link, and require the transmit end to retransmit same data. The receive end combines and decodes the received data. When there is a decoding success at the receive end, the receive end sends an acknowledgment (ACK) message to the transmit end to complete data transmission.

An embodiment based on HARQ may be a chase combining (CC-HARQ) solution. In the CC-HARQ solution, a data packet that is received by the receive end and that is incorrect or cannot be correctly decoded may be stored at the receive end, and is combined with retransmitted received data and then decoded. The data retransmitted in CC-HARQ may be the same as the originally transmitted data.

An embodiment based on HARQ may be incremental redundancy (IR-HARQ). In an embodiment, if correct decoding cannot be performed in first transmission, more redundant bits may be sent in a retransmission process, so as to reduce a channel encoding bit rate and further improve a decoding success rate. The data retransmitted in IR-HARQ may be different from the originally transmitted data.

However, currently, most HARQ solutions are usually designed for an additive white Gaussian noise (AWGN) channel. By using the design of a large coupled code formed by different transmission bits, the HARQ solution can obtain a good coding gain in an AWGN channel. However, for a fading channel, a channel change in the fading channel may cause a large change of a signal amplitude. Therefore, if a signal transmitted at a time suffers large fading, the foregoing design solution of a large coupled code of HARQ may not fully explore a gain of channel coding.

Based on this, an embodiment of this application provides a HARQ-based communication method. A plurality of information bits may be obtained in first transmission. The information bits are grouped into m groups to obtain a first information bit sequence $K_1, \ldots, K_m$, where m is a positive integer. First encoding is performed on m groups of first information bit sequences to obtain a first encoded codeword. Second encoding is performed on m groups of first encoded codewords to obtain a first target encoded codeword. The first target encoded codeword is sent to a receive end. If the first transmission fails, interleaving processing may be performed on n groups of first information bit sequences in the m groups of first information bit sequences in a retransmission process, to obtain m groups of first bit sequences $X_1, \ldots, X_m$, where n is less than m, t is greater than or equal to 1, and the m groups of first bit sequences include n groups of interleaved bit sequences. The first encoding is performed on the m groups of first bit sequences to obtain m groups of second encoded codewords. The second encoding is performed on the second encoded codewords to obtain a second target encoded codeword. The second target encoded codeword is sent to the receive end. In this way, interleaving processing is performed on some information bit sequences in a retransmission process, and subsequent encoding and decoding operations are performed on interleaved sequences. Such interleaving processing can improve code weight distribution in transmission and provide better transmission performance, thereby obtaining a good coding gain.

It may be understood that the HARQ-based communication method provided in an embodiment of the application may be applied to a channel encoding module and a channel decoding module shown in a dotted box in FIG. 2.

The following describes the words described in embodiments of this application. It may be understood that the description is intended to explain embodiments of this application more clearly, and does not necessarily constitute a limitation on embodiments of this application.

The information bit described in embodiments of this application may be a bit carrying information. The information bit may be obtained from a to-be-transmitted bit. The to-be-transmitted bit may include a plurality of information bits and a plurality of redundant bits (which may also be referred to as check bits).

The first information bit sequence described in embodiments of this application may be a bit sequence obtained by grouping information bits.

The first encoded codeword described in embodiments of this application may be an encoded codeword obtained by performing first encoding on the first information bit sequence.

The first (second or third) target encoded codeword described in embodiments of this application may be an encoded codeword obtained by performing second encoding on the first (second or third) encoded codeword.

The first bit sequence or the second bit sequence described in embodiments of this application may be a bit sequence obtained by performing interleaving processing on some information bit sequences in the first information bit sequence.

The second (or third) encoded codeword described in embodiments of this application may be an encoded codeword obtained by performing first encoding on the first (or second) bit sequence.

The soft information described in embodiments of this application may be understood as a log-likelihood ratio (LLR).

The following describes in detail, by using In an embodiment embodiments, the technical solutions of this application and how the technical solutions of this application resolve the foregoing technical problems. The following several In an embodiment embodiments may be implemented independently, or may be combined with each other. A same or similar concept or process may not be described again in some embodiments.

Figure 3:
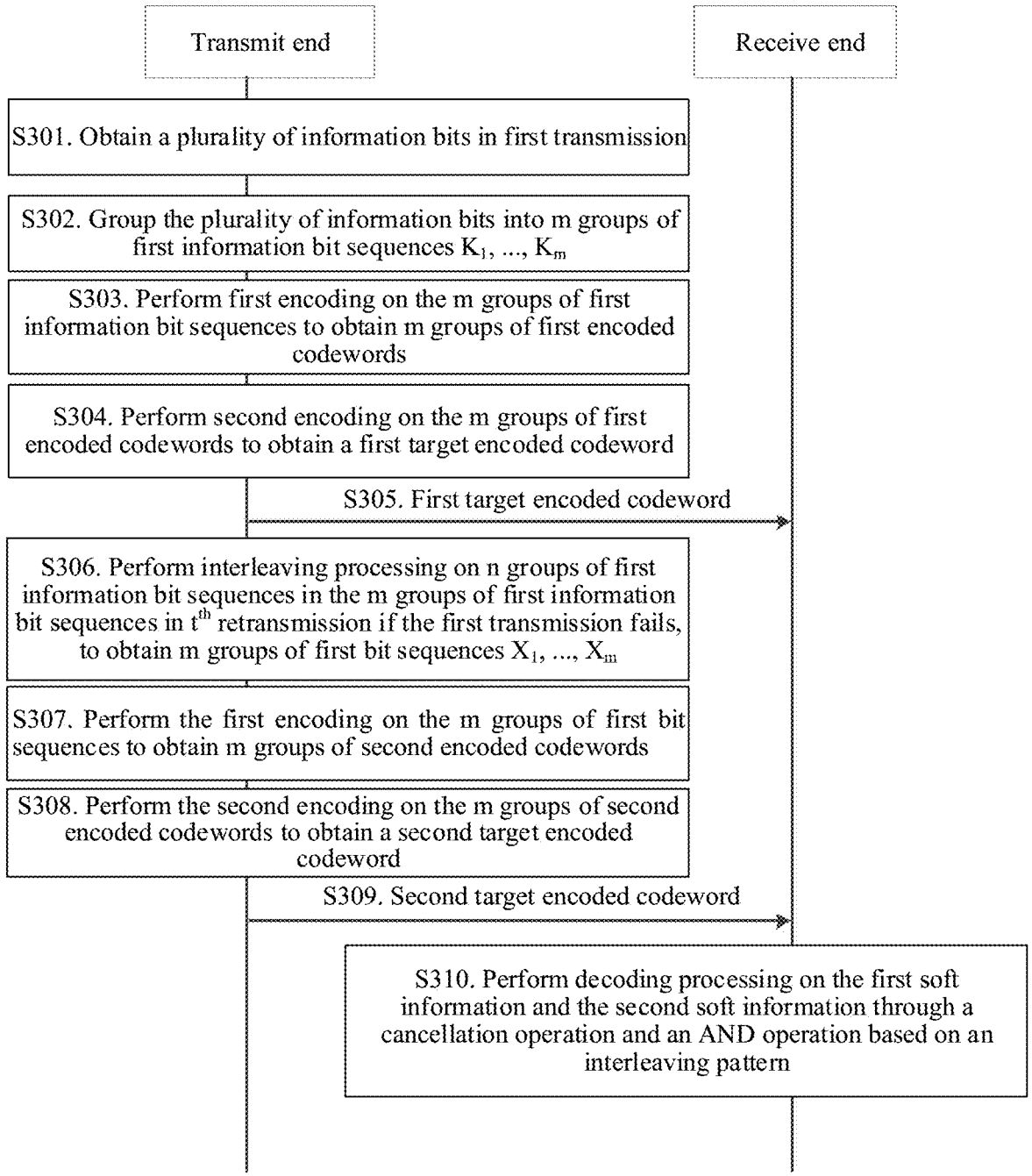
FIG. 3 is a schematic flowchart of a HARQ-based communication method according to an embodiment of the application.

FIG. 3 is a schematic flowchart of a HARQ-based communication method according to an embodiment of this application. As shown in FIG. 3, the method may include the following operations.

S301. A transmit end obtains a plurality of information bits in first transmission.

In an embodiment of the application, the first transmission may indicate a process in which the transmit end encodes the information bits for the first time, and transmits the encoded bit sequence to a receive end through a channel. For example, the transmit end may transmit information to the receive end for the first time based on a request of the receive end, or the transmit end may actively transmit information to the receive end for the first time. For example, a plurality of information bits allocated to subcodes may be obtained based on a code length, a code rate, a polar code/RM code structure, and/or a quantity m of groups of to-be-allocated subcodes of an equivalent to-be-transmitted code.

It may be understood that a manner of obtaining the plurality of information bits may include other content based on an actual scenario. This is not limited in embodiments of this application.

S302. The transmit end groups the plurality of information bits into m groups of first information bit sequences $K_1, \ldots, K_m$.

For example, an embodiment in which the transmit end groups the plurality of information bits into the m groups of first information bit sequences may be: grouping the plurality of information bits into m groups of first information bit sequences $K_1, \ldots, K_m$ based on a code length, a code rate, m, and/or a polar code structure of an equivalent to-be-transmitted code. m is a positive integer.

For example, an embodiment in which the transmit end groups the plurality of information bits into the m groups of first information bit sequences may be grouping based on lengths of the information bits. For example, the plurality of information bits may be grouped into m groups of first information bit sequences $K_1, \ldots, K_m$ based on lengths of the information bits. For example, a length of the information bit of $K_1$ is less than or equal to a length of the information bit of $K_m$.

It may be understood that a grouping manner of the information bits may include other content based on an actual scenario. This is not limited in embodiments of this application.

S303. The transmit end performs first encoding on the m groups of first information bit sequences to obtain m groups of first encoded codewords.

Figure 4:
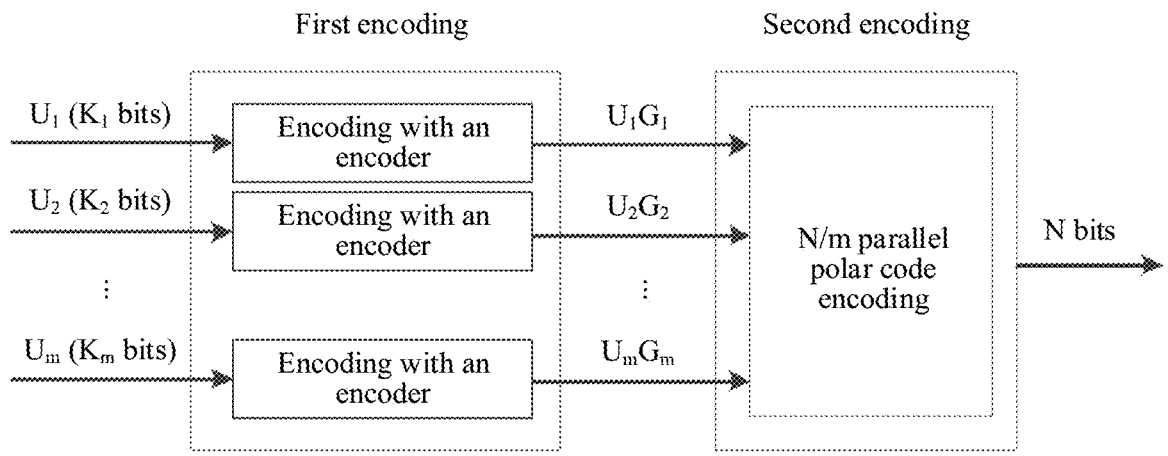
FIG. 4 is a schematic diagram of encoding according to an embodiment of the application.

In an embodiment of the application, the first encoding may be outer code coding. For example, FIG. 4 is a schematic diagram of encoding according to an embodiment of this application. As shown in FIG. 4, the first encoding is performed on m groups of first information bit sequences $K_1, K_2, \ldots, K_m$ respectively. An information bit sequence $U_1$ whose length is $K_1$ in a first group is inputted to an encoder of the first encoding for encoding to obtain $U_1G_1$. An information bit sequence $U_2$ whose length is $K_2$ in a second group is inputted to an encoder of the first encoding for encoding to obtain $U_2G_2$, to further obtain m groups of first encoded codewords, each of which has a length of N/m. $G_1, G_2, \ldots$, and $G_m$ may represent generator matrices respectively corresponding to the m groups of first information bit sequences. It may be understood that the method of performing first encoding on the first information bit sequences may include other content based on an actual scenario. This is not limited in embodiments of this application.

S304. The transmit end performs second encoding on the m groups of first encoded codewords to obtain a first target encoded codeword.

In an embodiment of the application, the second encoding may be inner code encoding. For example, as shown in FIG. 4, performing second encoding on the first encoded codewords may be understood as performing polar code encoding on the first encoded codewords to obtain the first target encoded codeword.

Figure 5:
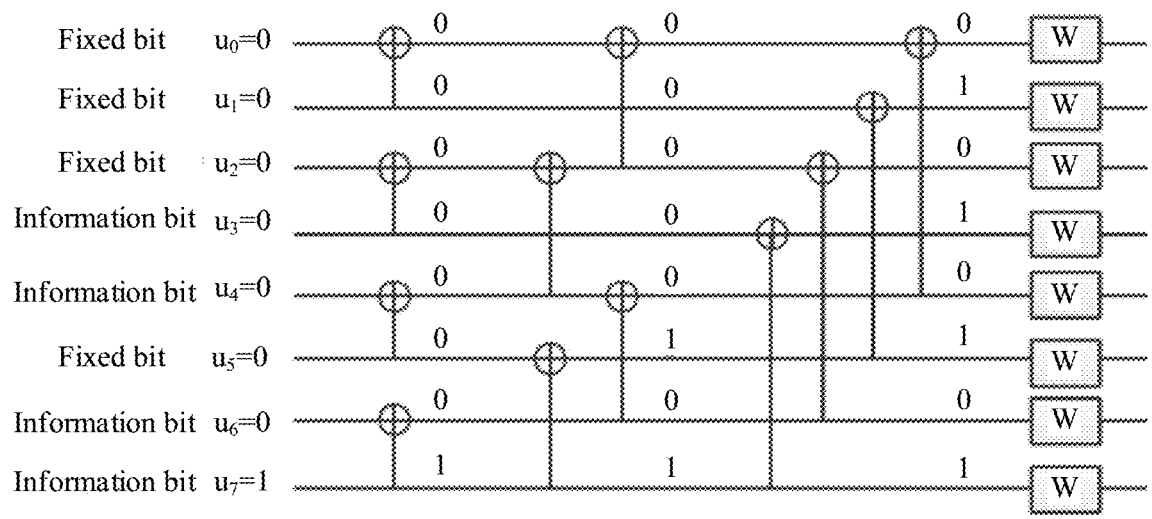
FIG. 5 is a schematic diagram of encoding a polar code whose length is 8 according to an embodiment of the application.

For example, FIG. 5 is a schematic diagram of encoding a polar code whose length is 8 according to an embodiment of this application. Encoded bits may be classified into fixed bits (frozen) and information bits (data) based on their respective reliability rankings. As shown in FIGS. 5, $U_7, U_6, U_5$, and $U_3$ are four bits whose reliability ranks high and are set as information bits, and $U_4, U_2, U_1$, and $U_0$ are four bits whose reliability ranks low and are set as fixed bits. The circled plus symbol represents an exclusive OR operation. It may be understood that the method of performing second encoding on the first encoded codewords may include other content based on an actual scenario. This is not limited in embodiments of this application.

S305. The transmit end sends the first target encoded codeword to a receive end.

Adaptively, the receive end may receive first to-be-decoded information, and determine first soft information of the first target encoded codeword based on the first to-be-decoded information. The first to-be-decoded information is related to the first target encoded codeword of the transmit end.

S306. The transmit end performs interleaving processing on n groups of first information bit sequences in the m groups of first information bit sequences in $t^{th}$ retransmission if the first transmission fails, to obtain m groups of first bit sequences $X_1, \ldots, X_m$.

In an embodiment of the application, n is less than m; t is greater than or equal to 1; and the m groups of first bit sequences include n groups of interleaved bit sequences. The m groups of first bit sequences may include: n groups of first information bit sequences that have undergone interleaving processing and (m−n) groups of bit sequences that have not undergone interleaving processing.

For example, an interleaving manner for performing interleaving processing on the n groups of first information bit sequences may be an existing interleaving manner, for example, random interleaving, or using an optimized interleaving pattern. It may be understood that a used interleaving manner may include other content based on an actual scenario. This is not limited in embodiments of this application.

For example, that the first transmission fails may be understood as that the transmit end transmits data to the receive end, and there is a decoding failure at the receive end; or the transmit end does not transmit data to the receive end; or the like.

The $t^{th}$ retransmission may refer to any retransmission after the first transmission fails. For example, when t=1, interleaving processing may be performed on the n groups of first information bit sequences in a process of first retransmission (which may also be understood as second transmission). When t=5, interleaving processing may be performed on the n groups of first information bit sequences in a process of fifth retransmission. It may be understood that the operations shown in S306 to S309 may be performed in the $t^{th}$ retransmission.

S307. The transmit end performs the first encoding on the m groups of first bit sequences to obtain m groups of second encoded codewords.

In an embodiment of the application, a coding scheme of performing first encoding on the m groups of first bit sequences is the same as the coding scheme of performing first encoding on the m groups of first information bit sequences. Details are not described herein again.

S308. The transmit end performs the second encoding on the m groups of second encoded codewords to obtain a second target encoded codeword.

In an embodiment of the application, a coding scheme of performing second encoding on the m groups of second encoded codewords is the same as the coding scheme of performing second encoding on the m groups of first encoded codewords. Details are not described herein again.

S309. The transmit end sends the second target encoded codeword to the receive end.

Adaptively, the receive end may receive second to-be-decoded information, and determine second soft information of the second target encoded codeword based on the second to-be-decoded information. The second to-be-decoded information is related to the second target encoded codeword of the transmit end.

S310. The receive end performs decoding processing on the first soft information and the second soft information through a cancellation operation and an AND operation based on an interleaving pattern.

In an embodiment of the application, the first to-be-decoded information is related to the first target encoded codeword of the transmit end; the second to-be-decoded information is related to the second target encoded codeword of the transmit end; the first target encoded codeword is obtained by performing encoding processing on m groups of first information bit sequences; the second target encoded codeword is obtained by performing encoding processing on m groups of first bit sequences; the m groups of first bit sequences are obtained by performing interleaving processing on n groups of first information bits in the m groups of first information bit sequences; and n is less than m.

Based on S310, in an embodiment, the n groups of first information bit sequences include: n groups of information bit sequences corresponding to layers whose reliability ranks low in the m groups of first information bit sequences. The reliability ranks in descending order.

In an embodiment, when interleaving is performed on first information bit sequences at a same location in the $t^{th}$ retransmission and the $(t+1)^{th}$ retransmission, an interleaving pattern for performing interleaving processing on the first information bit sequence at the same location in the $t^{th}$ retransmission is different from an interleaving pattern for performing interleaving processing on the first information bit sequence at the same location in the $(t+1)^{th}$ retransmission. The information bit sequences at the same location may be understood as same information bit sequences in different times of transmission.

In an embodiment, when interleaving is performed on first information bit sequences at different locations in the $t^{th}$ retransmission and the $(t+1)^{th}$ retransmission, an interleaving pattern for performing interleaving processing on the first information bit sequence at one of the different locations in the $t^{th}$ retransmission is the same as or different from an interleaving pattern for performing interleaving processing on the first information bit sequence at the other of the different locations in the $(t+1)^{th}$ retransmission. The information bit sequences at different locations may be understood as different information bit sequences in different times of transmission.

For example, when performing decoding processing, the receive end may combine and decode the first soft information and the second soft information. It may be understood that, when the transmit end sends a plurality of encoded codewords to the receive end in a plurality of times of transmission, the receive end may combine and decode a plurality of pieces of soft information corresponding to the plurality of encoded codewords.

For example, the cancellation operation and the AND operation may be a decoding method of performing decoding processing on the soft information. It may be understood that the method of performing decoding processing on the soft information may include other content based on an actual scenario. This is not limited in embodiments of this application.

In conclusion, in embodiments of this application, interleaving processing may be performed on some information bit sequences in a retransmission process, and subsequent encoding and decoding operations may be performed on interleaved sequences. Such interleaving processing can improve code weight distribution in transmission and provide better transmission performance, thereby obtaining a better coding gain.

Based on the embodiment corresponding to FIG. 3, the n groups of first information bit sequences include: n groups of information bit sequences corresponding to layers whose reliability ranks low in the m groups of first information bit sequences. The reliability ranks in descending order.

For example, when the reliability ranks in descending order, n groups of information bit sequences corresponding to layers whose reliability ranks low may be selected; or when the reliability ranks in ascending order, n groups of information bit sequences corresponding to layers whose reliability ranks high may be selected. For example, when interleaving processing is performed, n groups of first information bit sequences corresponding to layers with a low reliability in the m groups of first information bit sequences may be selected to perform the interleaving processing.

In an embodiment of the application, the interleaving processing can ensure accuracy of transmitted information during transmission, thereby providing better transmission performance.

Based on the embodiment corresponding to FIG. 3, an interleaving pattern of $X_m$ in the $t^{th}$ retransmission is different from an interleaving pattern of $X_m$ in $(t+1)^{th}$ retransmission.

In an embodiment of the application, the interleaving pattern may be understood as an interleaving mode, and same or different interleaving patterns can be implemented by using same or different interleavers.

Based on the embodiment corresponding to FIG. 3, the method further includes the following operations.

S401. Perform interleaving processing on s groups of first information bit sequences in he m groups of first information bit sequences in the $(t+1)^{th}$ retransmission if the $t^{th}$ retransmission fails, to obtain m groups of second bit sequences.

In an embodiment of the application, s is less than m; and the m groups of second bit sequences include s groups of interleaved bit sequences. s may be the same as n, or may be different from n. For example, if first information bit sequences are $K_1$, $K_2$, and $K_3$, where $U_1=K_1$ bits, $U_2=K_2$ bits, and $U_3=K_3$ bits, when first transmission fails, interleaving processing is performed on $U_1$ in $t^{th}$ retransmission, and when the $t^{th}$ transmission fails, in $(t+1)^{th}$ retransmission, interleaving processing may be performed on $U_1$, or interleaving processing may be performed on $U_2$ or $U_3$.

S402. Perform first encoding on the m groups of second bit sequences to obtain m groups of third encoded codewords.

S403. Perform second encoding on the m groups of third encoded codewords to obtain a third target encoded codeword.

S404. Send the third target encoded codeword to the receive end.

It may be understood that a retransmission process of the $(t+1)^{th}$ retransmission performed if the $t^{th}$ retransmission fails is similar to the retransmission process of the $t^{th}$ retransmission performed if the first transmission fails in the operations shown in S306 to S309, and details are not described herein again.

In embodiments of this application, interleaving processing is performed on some information bit sequences in a retransmission process, and subsequent encoding and decoding operations are performed on interleaved sequences. Such interleaving processing can improve code weight distribution in transmission and provide better transmission performance, thereby obtaining a better coding gain.

Based on the embodiment corresponding to FIG. 3, when interleaving is performed on first information bit sequences at a same location in the $t^{th}$ retransmission and the $(t+1)^{th}$ retransmission, an interleaving pattern for performing interleaving processing on the first information bit sequence at the same location in the $t^{th}$ retransmission is different from an interleaving pattern for performing interleaving processing on the first information bit sequence at the same location in the $(t+1)^{th}$ retransmission.

Figure 6:
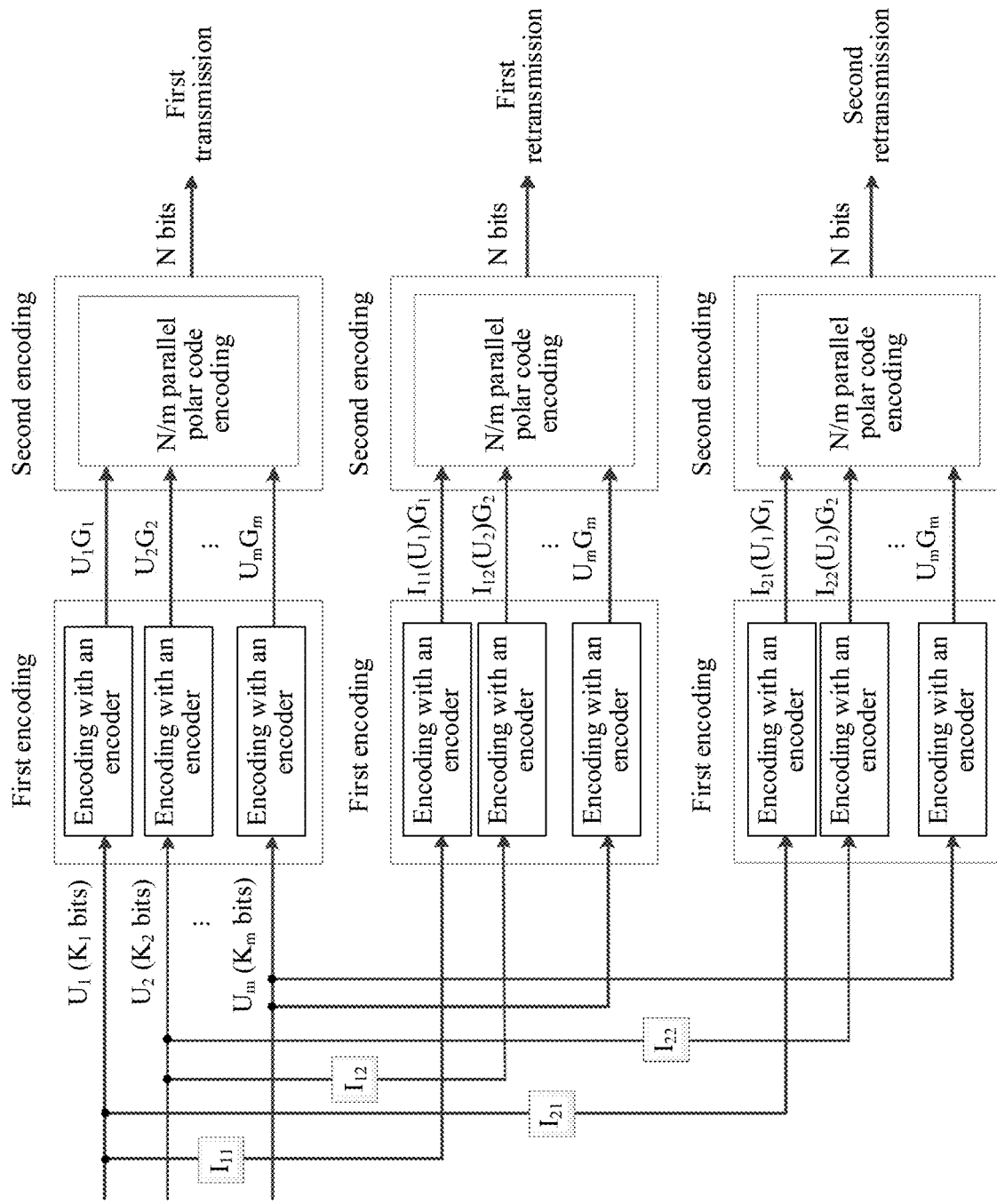
FIG. 6 is a schematic diagram of interleaving processing at a transmit end according to an embodiment of the application.

For example, FIG. 6 is a schematic diagram of interleaving processing at a transmit end according to an embodiment of this application. As shown in FIG. 6, first transmission is performed on information bit sequences ($U_1$, $U_2$, . . . , $U_m$). If the first transmission fails, first retransmission may be performed; and if the first retransmission fails, second retransmission may be performed.

An interleaver $I_{11}$ may be configured to perform interleaving processing on $U_1$ in the first retransmission, and an interleaver $I_{12}$ may be configured to perform interleaving processing on $U_2$ in the first retransmission. An interleaver $I_{21}$ may be configured to perform interleaving processing on $U_1$ in the second retransmission, and an interleaver $I_{22}$ may be configured to perform interleaving processing on $U_2$ in the second retransmission.

In an embodiment of the application, the information bit sequences at the same location may be understood as same information bit sequences in different times of transmission. For example, as shown in FIG. 6, $U_1$ in the first transmission, $I_{11}(U_1)$ in the first retransmission, and $I_{21}(U_1)$ in the second retransmission may be understood as the information bit sequences at the same location.

That the interleaving pattern for performing interleaving processing on the first information bit sequence at the same location in the $t^{th}$ retransmission is different from the interleaving pattern for performing interleaving processing on the first information bit sequence at the same location in the $(t+1)^{th}$ retransmission may be understood as follows: An interleaving pattern used by the interleaver $I_{11}$ that performs interleaving processing on $U_1$ in the first retransmission is different from an interleaving pattern used by the interleaver $I_{21}$ that performs interleaving processing on $U_1$ in the second retransmission, which may also be understood that the interleaver $I_{11}$ is different from the interleaver $I_{21}$.

In an embodiment of the application, a same interleaving pattern may be implemented by using a same interleaver, or different interleaving patterns may be implemented by using different interleavers. Such interleaving processing can improve code weight distribution in transmission and provide better transmission performance, thereby obtaining a better coding gain.

Based on the embodiment corresponding to FIG. 3, when interleaving is performed on first information bit sequences at different locations in the $t^{th}$ retransmission and the $(t+1)^{th}$ retransmission, an interleaving pattern for performing interleaving processing on the first information bit sequence at one of the different locations in the $t^{th}$ retransmission is the same as or different from an interleaving pattern for performing interleaving processing on the first information bit sequence at the other of the different locations in the $(t+1)^{th}$ retransmission.

In an embodiment of the application, the information bit sequences at different locations may be understood as different information bit sequences in different times of transmission. For example, as shown in FIG. 6, $U_1$ in the first transmission, $I_{12}(U_2)$ in the first retransmission, and $U_m$ (m is not equal to 1 or 2) in the second retransmission may be understood as the information bit sequences at different locations.

That the interleaving pattern for performing interleaving processing on the first information bit sequence at one of the different locations in the $t^{th}$ retransmission is the same as or different from the interleaving pattern for performing interleaving processing on the first information bit sequence at the other of the different locations in the $(t+1)^{th}$ retransmission may be understood as follows: An interleaving pattern used by the interleaver $I_{11}$ that performs interleaving processing on $U_1$ in the first retransmission is the same as or different from an interleaving pattern used by the interleaver $I_{22}$ that performs interleaving processing on $U_2$ in the second retransmission, which may also be understood that the interleaver $I_{11}$ is the same as or different from the interleaver $I_{22}$.

In an embodiment of the application, same or different interleaving patterns may be implemented by using same or different interleavers. Such interleaving processing can improve code weight distribution in transmission and provide better transmission performance, thereby obtaining a better coding gain.

Based on the content described in the foregoing embodiments, to better understand embodiments of this application, the following describes in detail a process of encoding at a transmit end and decoding at a receive end in embodiments of this application by using an example in which to-be-transmitted bits are (64, 42) and grouped into m (m=2) groups.

For example, the 42 information bits may be grouped into two groups of first information bit sequences, where $K_1=16$ bits, and $K_2=26$ bits.

Figure 7:
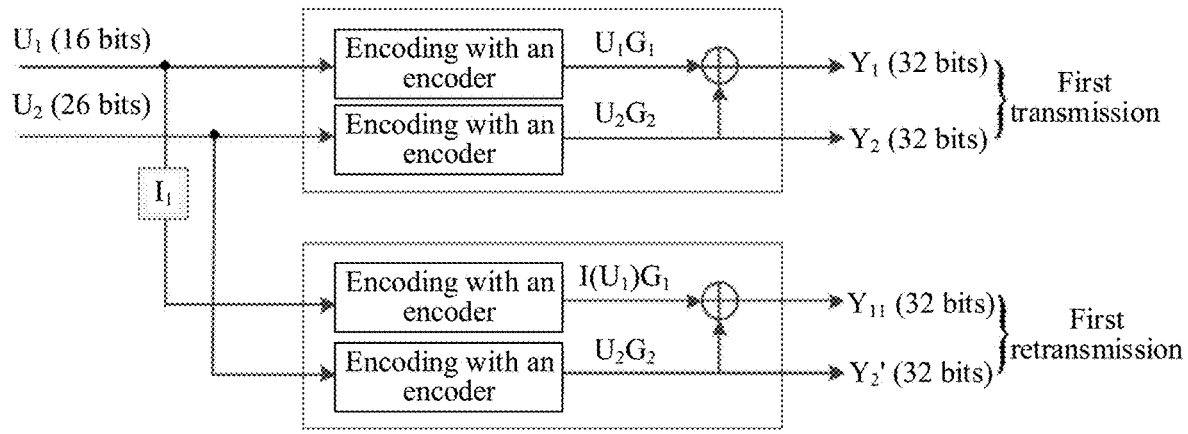
FIG. 7 is a schematic diagram of encoding at a transmit end when m=2 according to an embodiment of the application.

For example, FIG. 7 is a schematic diagram of encoding at a transmit end when m=2 according to an embodiment of this application. As shown in FIG. 7, an information bit sequence $U_1$ whose length is 16 is inputted to a first encoder and is encoded to obtain $C_1=U_1G_1$, and an information bit sequence $U_2$ whose length is 26 is inputted to a second encoder and is encoded to obtain $C_2=U_2G_2$. $C_1$ and $C_2$ are inputted into 32 2*2 polar code encoders whose bit rate is 1. At each time, an input of the polar code encoder is two bits, and an output of the polar code encoder is two bits. After the encoding is completed, first transmission is performed through a channel, and the receive end receives $Y_1$ and $Y_2$.

If the first transmission fails, the transmit end performs first retransmission, and may perform an interleaving operation on the first information bit sequence in advance. For example, an interleaver $I_1$ may be configured to perform interleaving processing on $U_1$ in the first retransmission, to obtain $I(U_1)$. A subsequent operation is the same as the process of the first transmission. The interleaved sequence may be encoded by the first encoder to obtain $I(U_1)G_1$, and $U_2$ is encoded by the second encoder to obtain $U_2G_2$. Then, $I(U_1)G_1$ and $U_2G_2$ are inputted into 32 2*2 polar code encoders whose bit rate is 1. After the encoding is completed, first retransmission is performed through a channel, and the receive end receives $Y_{11}$ and $Y_2'$.

Figure 8:
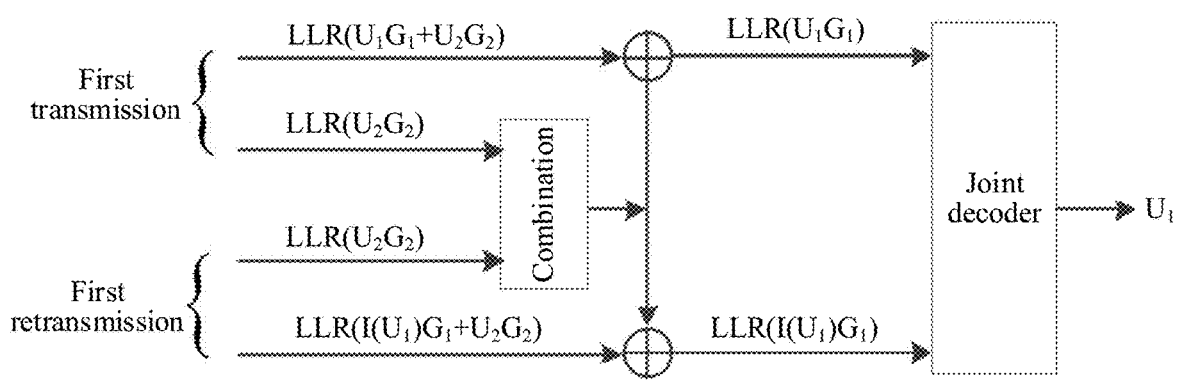
FIG. 8 is a schematic diagram 1 of decoding at a receive end when m=2 according to an embodiment of the application.

For example, FIG. 8 is a schematic diagram 1 of decoding at a receive end when m=2 according to an embodiment of this application. As shown in FIG. 8, corresponding LLRs may be obtained through calculation at the receive end. A first transmission channel may obtain: LLR $(U_1G_1+U_2G_2)$ (corresponding to $Y_1$) and LLR $(U_2G_2)$ (corresponding to $Y_2$). A first retransmission channel may obtain: LLR $(I(U_1)G_1+U_2G_2)$ (corresponding to $Y_{11}$) and LLR $(U_2G_2)$ (corresponding to $Y_2'$).

For example, if the information bit sequences $U_1$ and $U_2$ rank in descending order of reliability, interleaving processing may be performed on $U_1$ corresponding to a layer with a lower reliability in $U_1$ and $U_2$, to obtain interleaved sequences $I(U_1)$ and $U_2$.

As shown in FIG. 8, in a decoding processing process, the receive end may receive LLR $(U_1G_1+U_2G_2)$ and LLR $(U_2G_2)$ in the first transmission channel, and LLR $(I(U_1)G_1+U_2G_2)$ and LLR $(U_2G_2)$ in the first retransmission channel, where interleaving processing is performed on only $U_1$ in the first retransmission. Therefore, interleaving patterns used to perform interleaving processing on bit sequences at same or different locations in a plurality of times of retransmission are not limited.

In an embodiment, if the first retransmission fails, second retransmission may be performed, and interleaving processing may be performed on $U_1$ in the second retransmission.

Because interleaving processing is performed on the same bit sequence $U_1$ in both the first retransmission and the second retransmission, it can be ensured that an interleaving pattern for performing interleaving processing on $U_1$ in the second retransmission is different from an interleaving pattern for performing interleaving processing on $U_1$ in the first retransmission.

In an embodiment, if the first retransmission fails, second retransmission may be performed, and interleaving processing may be performed on $U_2$ in the second retransmission. Because interleaving processing is performed on different bit sequences in the first retransmission and the second retransmission, an interleaving pattern for performing interleaving processing on $U_2$ in the second retransmission is the same as or different from an interleaving pattern for performing interleaving processing on $U_1$ in the first retransmission.

It may be understood that, the limitation of the reliability in the information bit sequence and the interleaving pattern used to perform interleaving processing at same or different locations may be similar to that in the foregoing examples, and details are not described below again.

A correspondence with the interleaving pattern, the first interleaving pattern is so that such combination is performed instead of. The following is similar, and details are not described again.

For decoding $U_1$, a soft information combining operation (or referred to as a SUM operation) may be performed on LLRs corresponding to $Y_2$ and $Y_2'$ in two times of transmission, to obtain LLR $(U_2G_2)$. A cancellation operation is performed on LLR $(U_2G_2)$ with LLR $(U_1G_1+U_2G_2)$ and LLR $(I(U_1)G_1+U_2G_2)$ respectively, to respectively obtain LLR $(U_1G_1)$ and LLR $(I(U_1)G_1)$. The foregoing two pieces of soft information are inputted to a joint decoder for decoding, to obtain $U_1$.

Figure 9:
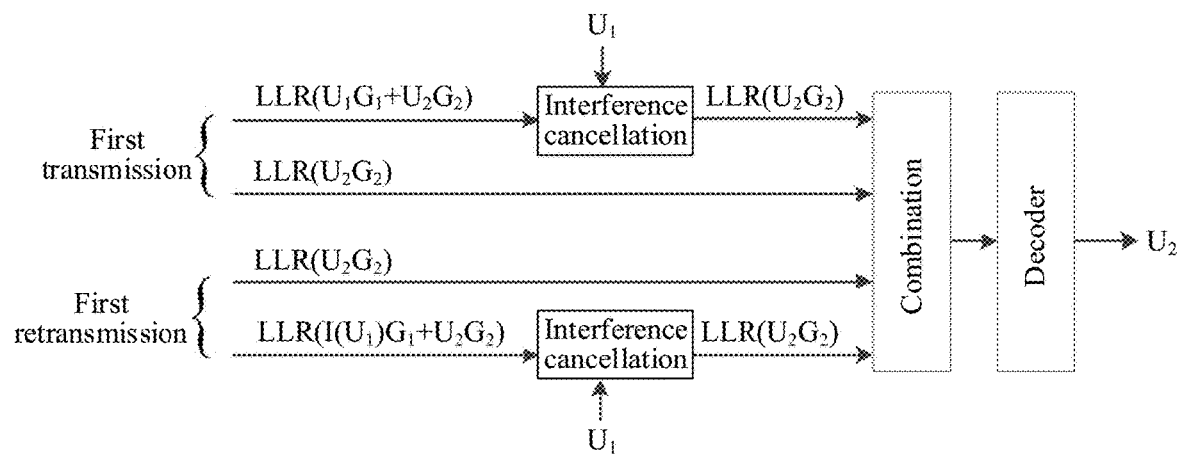
FIG. 9 is a schematic diagram 2 of decoding at a receive end when m=2 according to an embodiment of the application.

For example, FIG. 9 is a schematic diagram 2 of decoding at a receive end when m=2 according to an embodiment of this application. As shown in FIG. 9, for decoding $U_2$, an interference cancellation operation may be performed on $U_1$ with LLR $(U_1G_1+U_2G_2)$ and LLR $(I(U_1)G_1+U_2G_2)$ respectively, to respectively obtain LLRs $(U_2G_2)$. In this case, four LLRs $(U_2G_2)$ can be obtained. A SUM operation is performed on the foregoing four pieces of soft information, and corresponding polar code (or RM code) decoding is performed, to obtain $U_2$.

Figure 10:
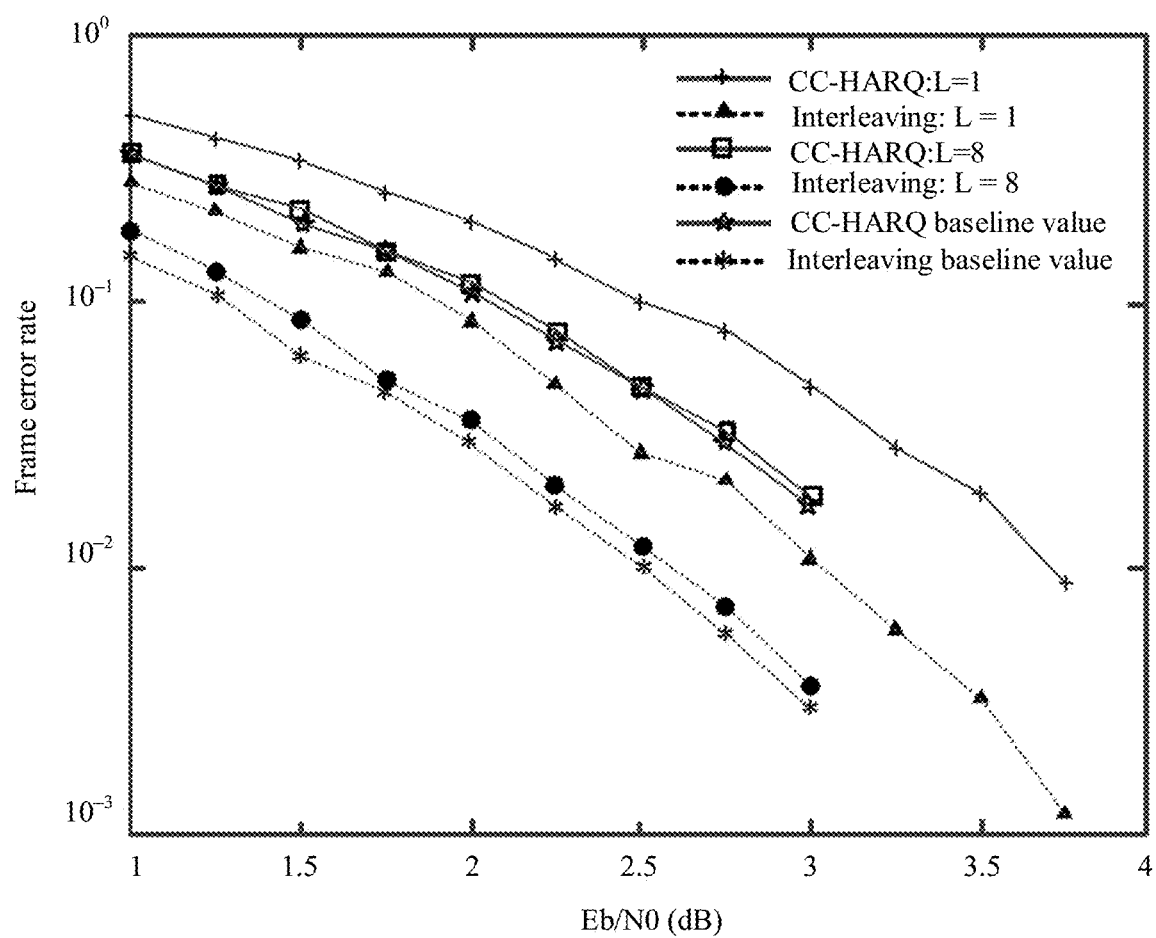
FIG. 10 is a schematic diagram of a simulation effect when m=2 according to an embodiment of the application.

For example, FIG. 10 is a schematic diagram of a simulation effect when m=2 according to an embodiment of this application. As shown in FIG. 10, decoding is performed by using an SCL. L=1 indicates that in the SCL decoding method, a quantity of decoding paths is 1, and L=8 indicates that a quantity of decoding paths is 8. ML represents baselines corresponding to different solutions, and may also be understood as an optimal decoding method. The interleaving may be short for the HARQ communication method provided in embodiments of this application.

It can be learned from the simulation result that, compared with CC-HARQ, the HARQ communication solution provided in an embodiment of the application can provide a gain of 0.75 dB.

It may be understood that the foregoing schematic diagrams of encoding and decoding are merely examples, and are not intended as a limitation on embodiments of this application.

In embodiments of this application, interleaving processing is performed on some information bit sequences in a retransmission process, and subsequent encoding and decoding operations are performed on interleaved sequences. Such interleaving processing can improve code weight distribution in transmission and provide better transmission performance, thereby obtaining a better coding gain.

The following describes in detail a process of encoding at a transmit end and decoding at a receive end in embodiments of this application by using an example in which to-be-transmitted bits are (128, 99) and grouped into m (m=4) groups.

For example, the 99 information bits may be grouped into four groups of first information bit sequences, where $K_1=16$ bits, $K_2=26$ bits, $K_3=26$ bits, and $K_4=31$ bits.

Figure 11:
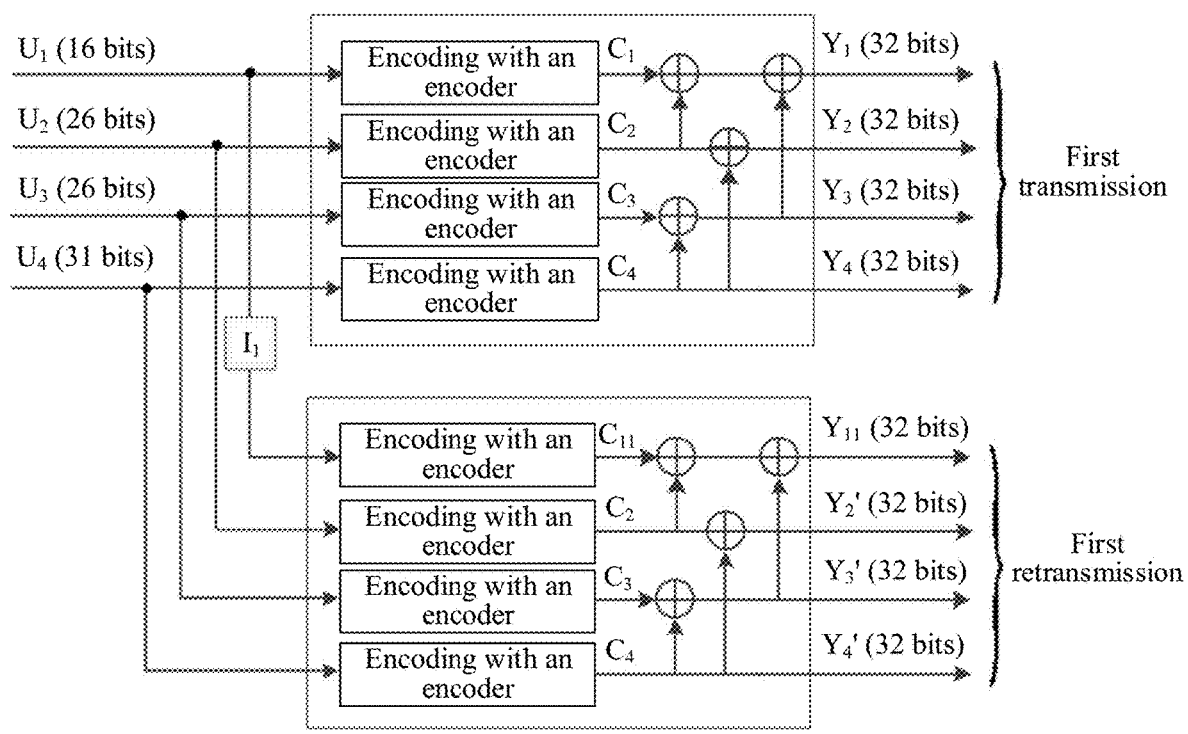
FIG. 11 is a schematic diagram of encoding at a transmit end when m=4 according to an embodiment of the application.

For example, FIG. 11 is a schematic diagram of encoding at a transmit end when m=4 according to an embodiment of this application. As shown in FIG. 11, an information bit sequence $U_1$ whose length is 16 is inputted to a first encoder and is encoded to obtain $C_1=U_1G_1$, an information bit sequence $U_2$ whose length is 26 is inputted to a second encoder and is encoded to obtain $C_2=U_2G_2$, an information bit sequence $U_3$ whose length is 26 is inputted to a third encoder and is encoded to obtain $C_3=U_3G_3$, and an information bit sequence $U_4$ whose length is 31 is inputted to a fourth encoder and is encoded to obtain $C_4=U_4G_4$. $C_1$, $C_2$, $C_3$, and $C_4$ are inputted into 32 4*4 polar code encoders whose bit rate is 1. At each time, an input of the polar code encoder is four bits, and an output of the polar code encoder is four bits. After the encoding is completed, first transmission is performed through a channel, and the receive end receives $Y_1$, $Y_2$, $Y_3$, and $Y_4$.

If the first transmission fails, the transmit end performs first retransmission, and may perform an interleaving operation on the first information bit sequence in advance. For example, an interleaver $I_1$ may be configured to perform interleaving processing on $U_1$ in the first retransmission, to obtain $I(U_1)$. A subsequent operation is the same as the process of the first transmission. The interleaved sequence may be encoded by the first encoder to obtain $C_{11}=I(U_1)G_1$, $U_2$ may be encoded by the second encoder to obtain $C_2=U_2G_2$, $U_3$ may be encoded by the third encoder to obtain $C_3=U_3G_3$, and $U_4$ may be encoded by the fourth encoder to obtain $C_4=U_4G_4$. Then, $C_1$, $C_2$, $C_3$, and $C_4$ are inputted into the 4*4 polar code encoder. After the encoding is completed, first retransmission is performed through a channel, and the receive end receives $Y_{11}$, $Y_2'$, $Y_3'$, and $Y_4'$.

Figure 12:
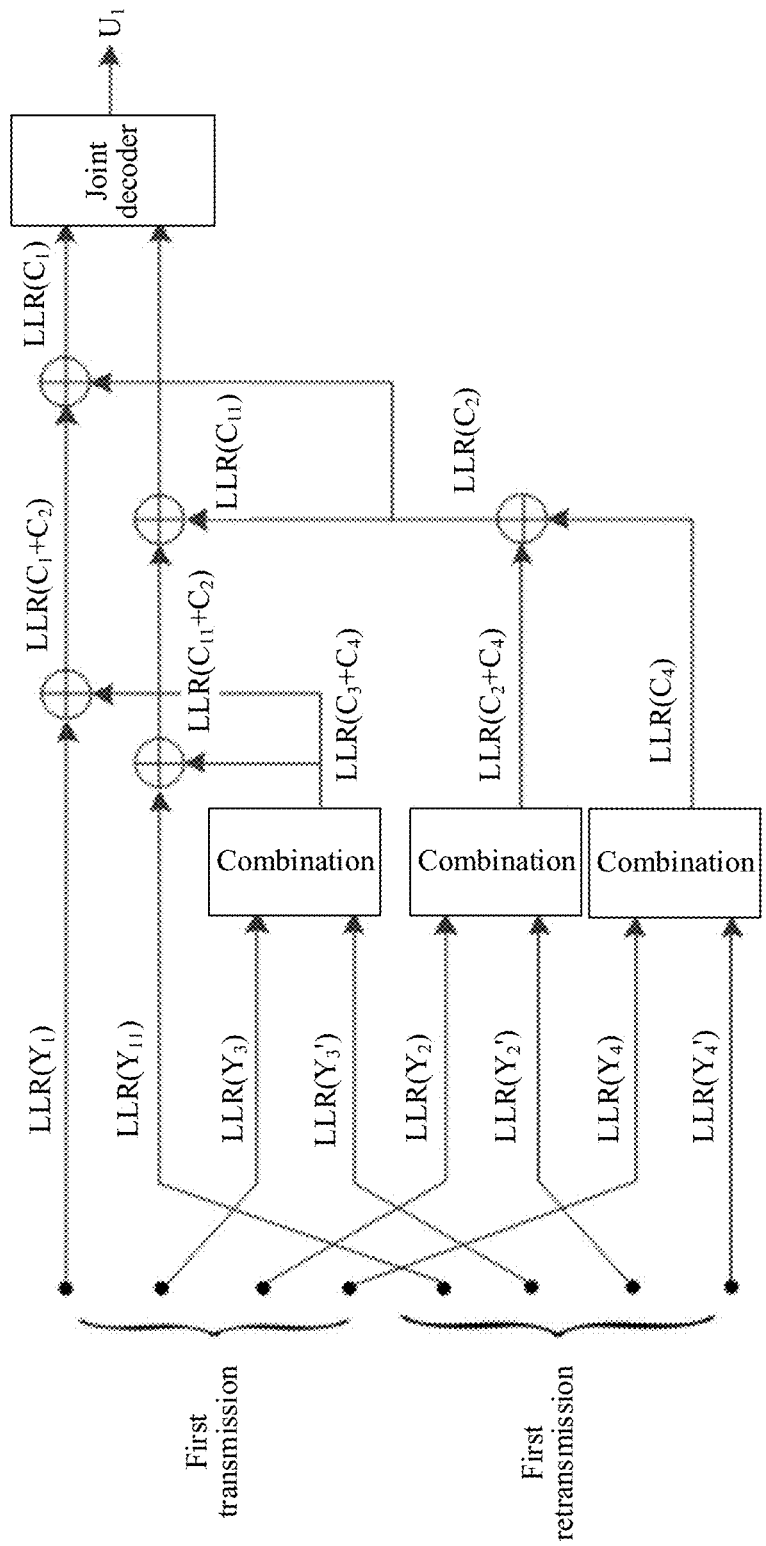
FIG. 12 is a schematic diagram 1 of decoding at a receive end when m=4 according to an embodiment of the application.

For example, FIG. 12 is a schematic diagram 1 of decoding at a receive end when m=4 according to an embodiment of this application. As shown in FIG. 12, corresponding soft information may be obtained through calculation at the receive end. A first transmission channel may obtain: LLR ($Y_1$), LLR ($Y_2$), LLR ($Y_3$), and LLR ($Y_4$). A first retransmission channel may obtain: LLR ($Y_{11}$), LLR ($Y_2'$), LLR ($Y_3'$), and LLR ($Y_4'$).

For decoding $U_1$, a SUM operation may be performed on LLRs corresponding to $Y_2$ and $Y_2'$ in two times of transmission, a SUM operation may be performed on LLRs corresponding to $Y_3$ and $Y_3'$, and a SUM operation may be performed on LLRs corresponding to $Y_4$ and $Y_4'$. Through the SUM, LLR ($C_2+C_4$), LLR ($C_3+C_4$), and LLR ($C_4$) may be respectively obtained.

A cancellation operation is performed on LLR ($C_3+C_4$) in the SUM result respectively with LLR ($Y_1$) and LLR ($Y_{11}$), to obtain LLR ($C_1+C_2$) and LLR ($C_{11}+C_2$) respectively. A cancellation operation is performed on LLR ($C_2+C_4$) and LLR ($C_4$) in the SUM result, to obtain LLR ($C_2$). A cancellation operation is performed on LLR ($C_2$) respectively with LLR ($C_1+C_2$) and LLR ($C_{11}+C_2$), to obtain LLR ($C_1$) and LLR ($C_{11}$) respectively. LLR ($C_1$) and LLR ($C_{11}$) are inputted to a joint decoder for decoding, to obtain $U_1$.

Figure 13:
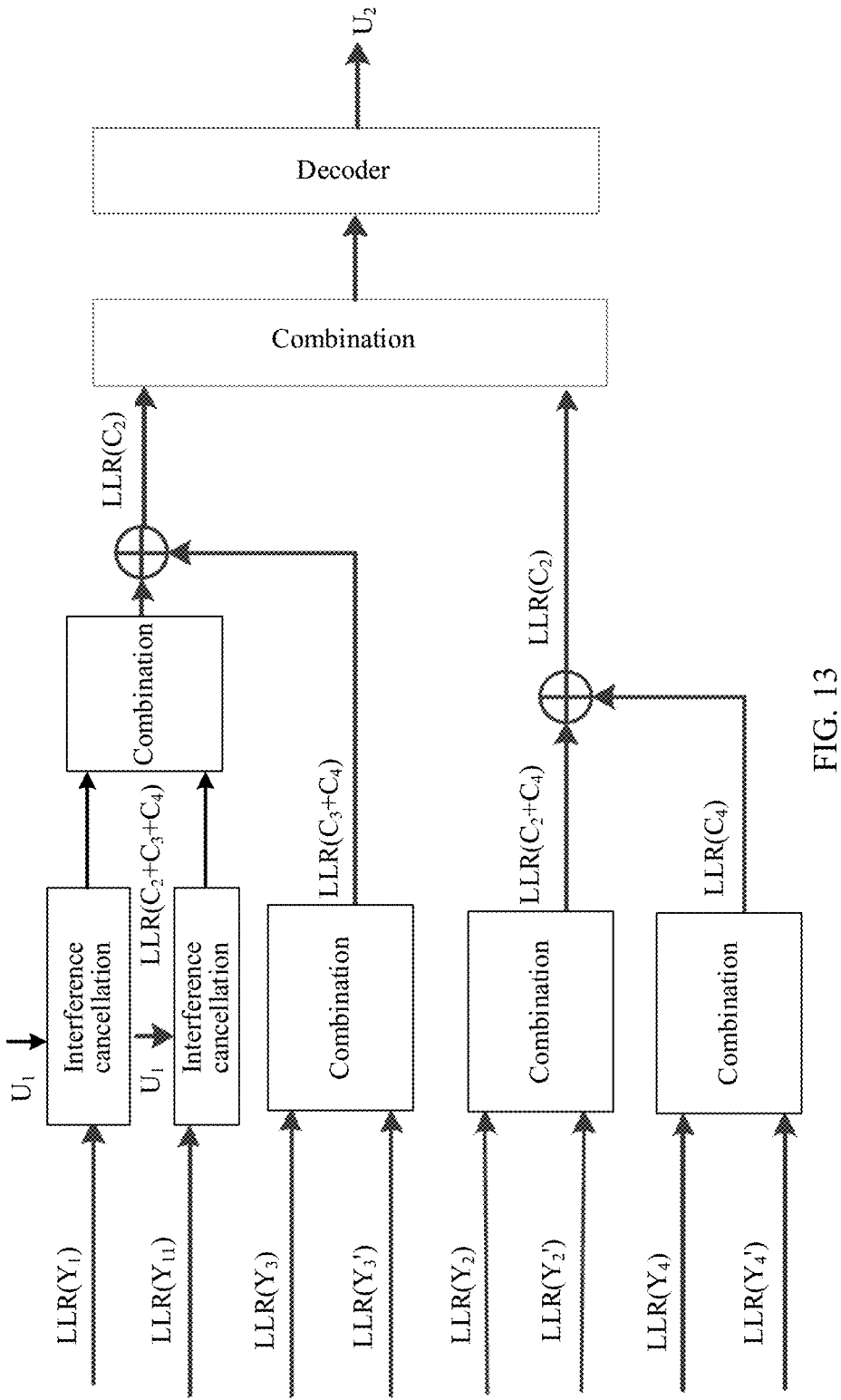
FIG. 13 is a schematic diagram 2 of decoding at a receive end when m=4 according to an embodiment of the application.

For example, FIG. 13 is a schematic diagram 2 of decoding at a receive end when m=4 according to an embodiment of this application. As shown in FIG. 13, for decoding $U_2$, an interference cancellation operation may be performed on $U_1$ with LLR ($Y_1$) and LLR ($Y_{11}$) respectively, to respectively obtain LLRs ($C_2+C_3+C_4$) respectively. A SUM operation is performed on LLRs ($C_2+C_3+C_4$) to obtain LLR ($C_2+C_3+C_4$). A cancellation operation is performed on LLR ($C_2+C_3+C_4$) with LLR ($C_3+C_4$) as a SUM operation result of LLR ($Y_3$) and LLR ($Y_3'$), to obtain LLR ($C_2$). A cancellation operation is performed on LLR ($C_2+C_4$), as a SUM operation result of LLR ($Y_2$) and LLR ($Y_2'$), and LLR ($C_4$), as a SUM operation result of LLR ($Y_4$) and LLR ($Y_4'$), to obtain LLR ($C_2$). In this case, a SUM operation is performed on the foregoing two LLRs ($C_2$), and corresponding polar code (or RM code) decoding is performed, to obtain $U_2$.

Figure 14:
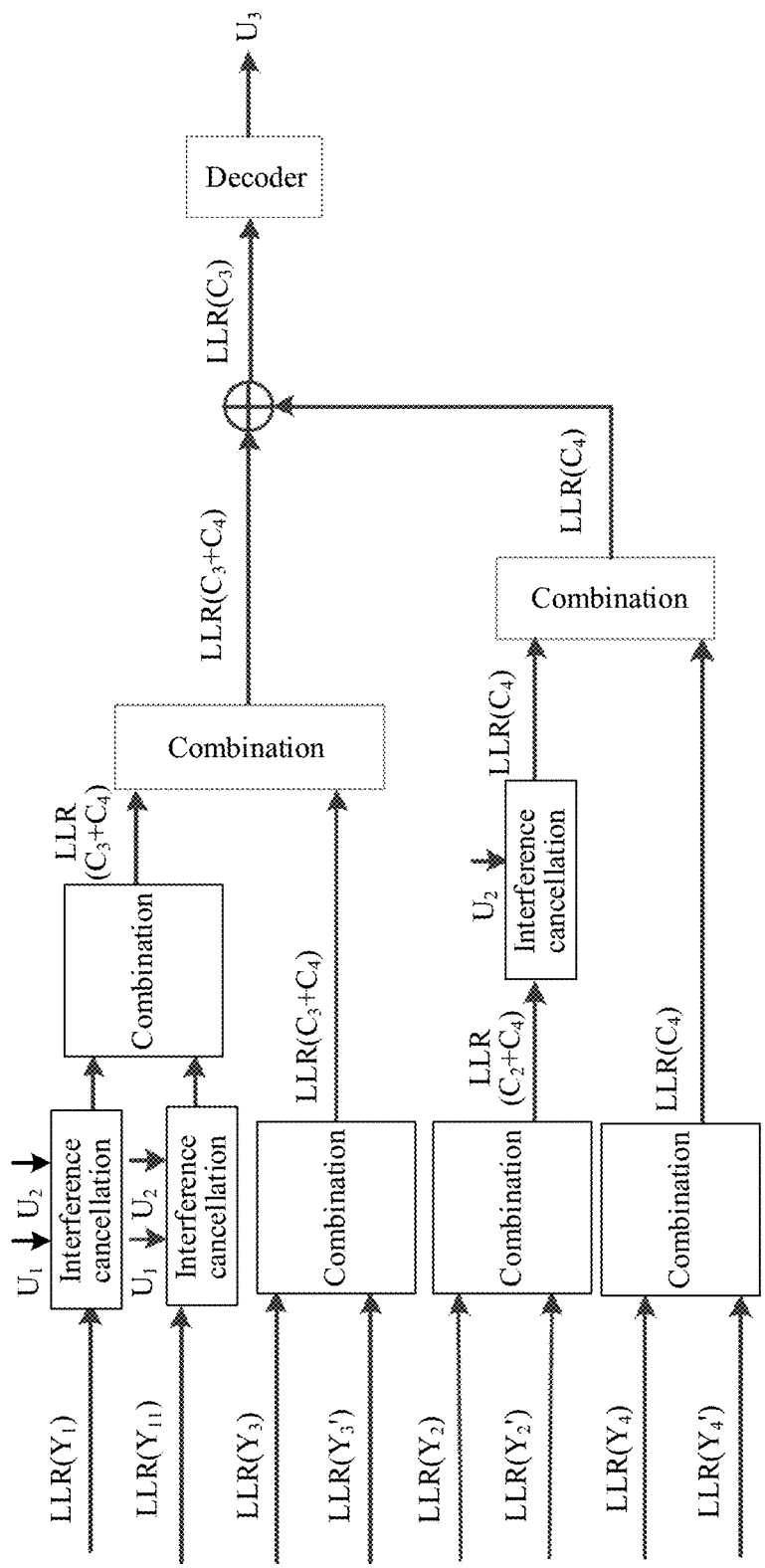
FIG. 14 is a schematic diagram 3 of decoding at a receive end when m=4 according to an embodiment of the application.

For example, FIG. 14 is a schematic diagram 3 of decoding at a receive end when m=4 according to an embodiment of this application. As shown in FIG. 14, for decoding $U_3$, an interference cancellation operation may be performed on $U_1$ and $U_2$ with LLR ($Y_1$) and LLR ($Y_{11}$) respectively, to respectively obtain LLRs ($C_3+C_4$). A SUM operation is performed on LLRs ($C_3+C_4$) to obtain LLR ($C_3+C_4$). A SUM operation is performed on LLR ($Y_2$) and LLR ($Y_2'$) to obtain LLR ($C_2+C_4$). An interference cancellation operation is performed on $U_2$ with LLR ($C_2+C_4$) to obtain LLR ($C_4$). A SUM operation is performed on the foregoing LLR ($C_4$) and LLR ($C_4$) as a SUM operation result of LLR ($Y_4$) and LLR ($Y_4'$), to obtain LLR ($C_4$). A SUM operation is performed on the foregoing LLR ($C_3+C_4$) and LLR ($C_3+C_4$) as a SUM operation result of LLR ($Y_3$) and LLR ($Y_3'$), to obtain LLR ($C_3+C_4$). A cancellation operation is performed on LLR ($C_3+C_4$) and LLR ($C_4$) to obtain LLR ($C_3$). Corresponding polar code (or RM code) decoding is performed on LLR ($C_3$), to obtain $U_3$.

Figure 15:
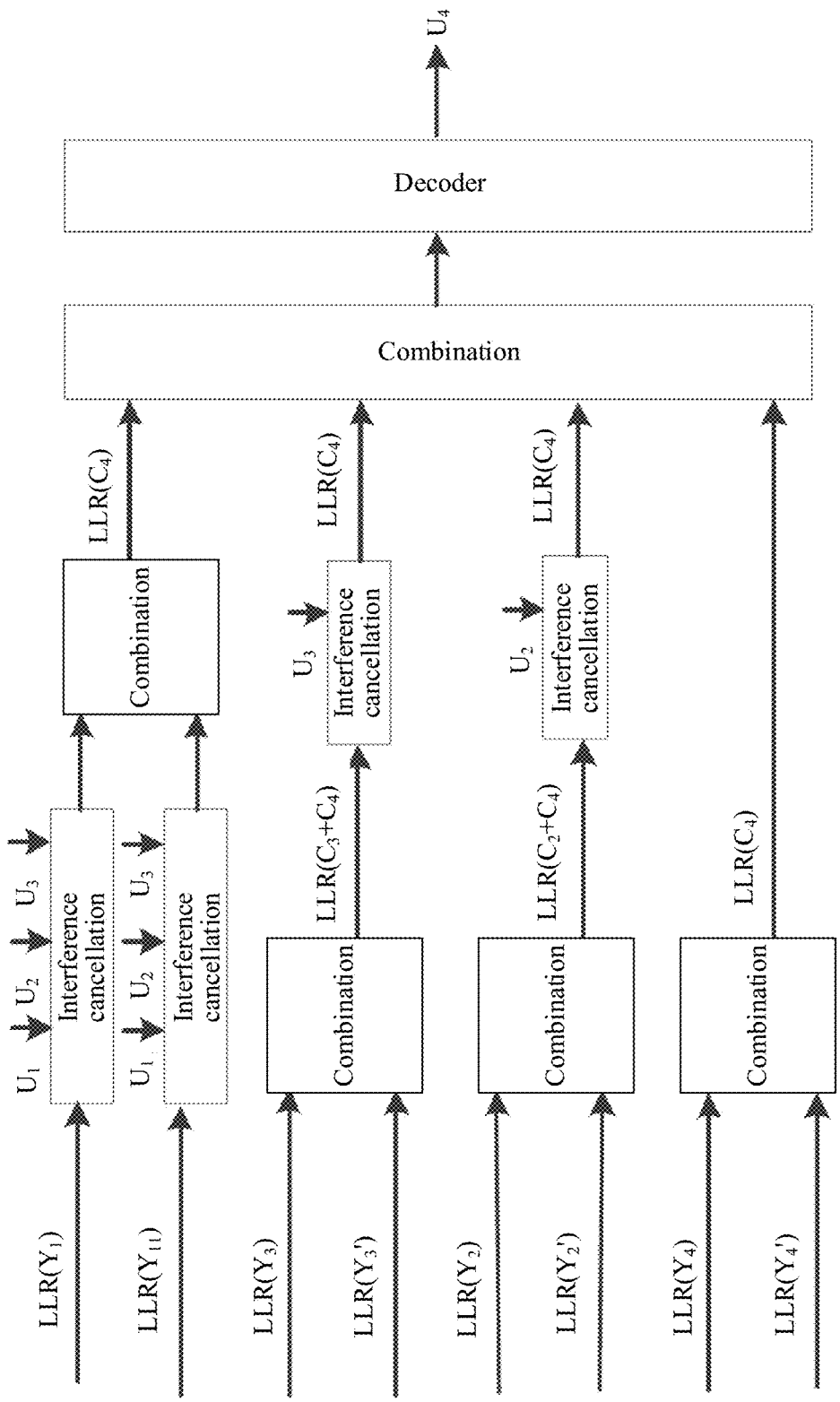
FIG. 15 is a schematic diagram 4 of decoding at a receive end when m=4 according to an embodiment of the application.

For example, FIG. 15 is a schematic diagram 4 of decoding at a receive end when m=4 according to an embodiment of this application. As shown in FIG. 15, for decoding $U_4$, an interference cancellation operation may be performed on $U_1$, $U_2$, and $U_3$ with LLR ($Y_1$) and LLR ($Y_{11}$) respectively, to respectively obtain LLRs ($C_4$). A SUM operation is performed on LLRs ($C_4$) to obtain LLR ($C_4$). A SUM operation is performed on LLR ($Y_2$) and LLR ($Y_2'$) to obtain a result LLR ($C_2+C_4$). An interference cancellation operation is performed on $U_2$ with LLR ($C_2+C_4$), to obtain LLR ($C_4$). A SUM operation is performed on LLR ($Y_3$) and LLR ($Y_3'$) to obtain a result LLR ($C_3+C_4$). An interference cancellation operation is performed on $U_3$ with LLR ($C_3+C_4$), to obtain LLR ($C_4$). A SUM operation is performed on LLR ($Y_4$) and LLR ($Y_4'$) to obtain LLR ($C_4$). A SUM operation is performed on the four LLRs ($C_4$), and corresponding polar code (or RM code) decoding is performed, to obtain $U_4$.

It may be understood that the foregoing schematic diagrams of encoding and decoding are merely examples, and are not intended as a limitation on embodiments of this application.

In embodiments of this application, interleaving processing is performed on some information bit sequences in a retransmission process, and subsequent encoding and decoding operations are performed on interleaved sequences. Such interleaving processing can improve code weight distribution in transmission and provide better transmission performance, thereby obtaining a better coding gain.

The method in embodiments of this application is described above with reference to FIG. 3 to FIG. 15. The following describes a HARQ-based communication apparatus for performing the foregoing method provided in embodiments of this application. One of ordinary skilled in the art may understand that the method and the apparatus may be mutually combined and referenced. A HARQ-based communication apparatus provided in embodiments of this application may perform the operations performed by the transmit end in the foregoing HARQ-based communication method. Another HARQ-based communication apparatus may perform the operations performed by the receive end in the foregoing HARQ-based communication method.

Figure 16:
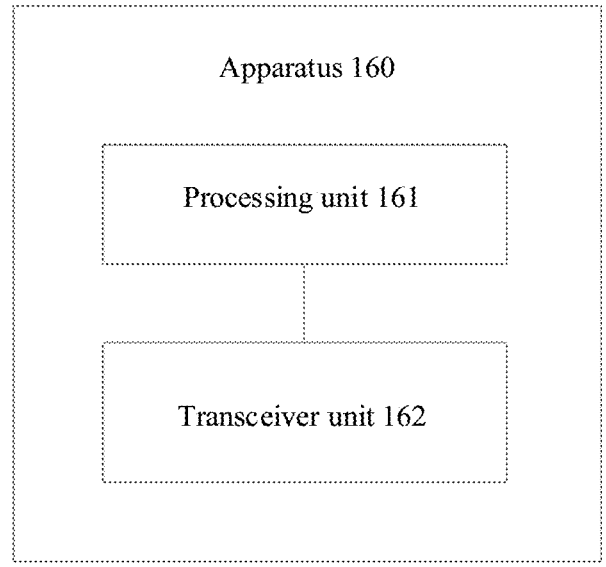
FIG. 16 shows a HARQ-based communication apparatus 160 according to an embodiment of the application.

As shown in FIG. 16, FIG. 16 shows a HARQ-based communication apparatus 160 (or referred to as an apparatus 160) according to an embodiment of this application. The apparatus 160 may be a transmit end or a receive end in embodiments of this application, or may be a chip applied to the transmit end or the receive end. The apparatus 160 includes: a processing unit 161 and a transceiver unit 162. The transceiver unit 162 is configured to support the apparatus 160 in performing an operation of information sending or receiving, and the processing unit 161 is configured to support the apparatus 160 in performing an operation of information processing.

A hybrid automatic repeat request HARQ-based communication apparatus 160 includes: a processing unit 161 and a transceiver unit 162. The processing unit 161 is configured to obtain a plurality of information bits in first transmission. The processing unit 161 is further configured to group the plurality of information bits into m groups of first information bit sequences $K_1, \ldots, K_m$, where m is a positive integer. The processing unit 161 is further configured to perform first encoding on the m groups of first information bit sequences to obtain m groups of first encoded codewords. The processing unit 161 is further configured to perform second encoding on the m groups of first encoded codewords to obtain a first target encoded codeword. The transceiver unit 162 is configured to send the first target encoded codeword to a receive end. The processing unit 161 is further configured to perform interleaving processing on n groups of first information bit sequences in the m groups of first information bit sequences in $t^{th}$ retransmission if the first transmission fails, to obtain m groups of first bit sequences $X_1, \ldots, X_m$, where n is less than m; t is greater than or equal to 1; and the m groups of first bit sequences include n groups of interleaved bit sequences. The processing unit 161 is further configured to perform the first encoding on the m groups of first bit sequences to obtain m groups of second encoded codewords. The processing unit 161 is further configured to perform the second encoding on the m groups of second encoded codewords to obtain a second target encoded codeword. The transceiver unit 162 is further configured to send the second target encoded codeword to the receive end.

In an embodiment, the n groups of first information bit sequences include: n groups of information bit sequences corresponding to layers whose reliability ranks low in the m groups of first information bit sequences. The reliability ranks in descending order.

In an embodiment, an interleaving pattern of $X_m$ in the $t^{th}$ retransmission is different from an interleaving pattern of $X_m$ in $(t+1)^{th}$ retransmission.

In an embodiment, the processing unit 161 is further configured to: perform interleaving processing on s groups of first information bit sequences in the m groups of first information bit sequences in the $(t+1)^{th}$ retransmission if the $t^{th}$ retransmission fails, to obtain m groups of second bit sequences, where s is less than m; and the m groups of second bit sequences include s groups of interleaved bit sequences; perform the first encoding on them groups of second bit sequences to obtain m groups of third encoded codewords; and perform the second encoding on the m groups of third encoded codewords to obtain a third target encoded codeword. The transceiver unit 162 is further configured to send the third target encoded codeword to the receive end.

In an embodiment, when interleaving is performed on first information bit sequences at a same location in the $t^{th}$ retransmission and the $(t+1)^{th}$ retransmission, an interleaving pattern for performing interleaving processing on the first information bit sequence at the same location in the $t^{th}$ retransmission is different from an interleaving pattern for performing interleaving processing on the first information bit sequence at the same location in the $(t+1)^{th}$ retransmission.

In an embodiment, when interleaving is performed on first information bit sequences at different locations in the $t^{th}$ retransmission and the $(t+1)^{th}$ retransmission, an interleaving pattern for performing interleaving processing on the first information bit sequence at one of the different locations in the $t^{th}$ retransmission is the same as or different from an interleaving pattern for performing interleaving processing on the first information bit sequence at the other of the different locations in the $(t+1)^{th}$ retransmission.

A hybrid automatic repeat request HARQ-based communication apparatus 160 includes: a transceiver unit 162, configured to receive first to-be-decoded information in first transmission from a transmit end; and a processing unit 161, configured to determine first soft information based on the first to-be-decoded information. The transceiver unit 162 is further configured to receive second to-be-decoded information in $t^{th}$ retransmission from the transmit end if the first transmission fails. The processing unit 161 is further configured to determine second soft information based on the second to-be-decoded information. The processing unit 161 is further configured to perform decoding processing on the first soft information and the second soft information through a cancellation operation and an AND operation based on an interleaving pattern. The first to-be-decoded information is related to a first target encoded codeword of the transmit end; the second to-be-decoded information is related to the second target encoded codeword of the transmit end; the first target encoded codeword is obtained by performing encoding processing on m groups of first information bit sequences; the second target encoded codeword is obtained by performing encoding processing on m groups of first bit sequences; the m groups of first bit sequences are obtained by performing interleaving processing on n groups of first information bits in the m groups of first information bit sequences; and n is less than m. In an embodiment, the n groups of first information bit sequences include: n groups of information bit sequences corresponding to layers whose reliability ranks low in them groups of first information bit sequences. The reliability ranks in descending order.

In an embodiment, when interleaving is performed on first information bit sequences at a same location in the $t^{th}$ retransmission and the $(t+1)^{th}$ retransmission, an interleaving pattern for performing interleaving processing on the first information bit sequence at the same location in the $t^{th}$ retransmission is different from an interleaving pattern for performing interleaving processing on the first information bit sequence at the same location in the $(t+1)^{th}$ retransmission.

In an embodiment, when interleaving is performed on first information bit sequences at different locations in the $t^{th}$ retransmission and the $(t+1)^{th}$ retransmission, an interleaving pattern for performing interleaving processing on the first information bit sequence at one of the different locations in the $t^{th}$ retransmission is the same as or different from an interleaving pattern for performing interleaving processing on the first information bit sequence at the other of the different locations in the $(t+1)^{th}$ retransmission.

An embodiment of this application provides a HARQ-based communication apparatus. The apparatus 160 includes one or more modules, configured to implement the method in the operations included in FIG. 3 to FIG. 15. The one or more modules may correspond to operations of the method in the operations included in FIG. 3 to FIG. 15.

It should be understood that the apparatus 160 herein is embodied in a form of a functional unit. The term "unit" herein may be an application-specific integrated circuit (ASIC), an electronic circuit, a processor (such as a shared processor, a special purpose processor, or a group processor) configured to execute one or more software or firmware programs, a memory, a combinational logic circuit, and/or another suitable component that supports the described function. In an optional example, one of ordinary skilled in the art may understand that the apparatus 160 may be the transmit end or the receive end in the foregoing embodiments, and the apparatus 160 may be configured to perform procedures and/or operations corresponding to the transmit end or the receive end in the foregoing method embodiments. To avoid repetition, details are not described herein again.

The apparatus 160 in the foregoing solutions has functions of implementing corresponding operations performed by the transmit end or the receive end in the foregoing method. The functions may be implemented by hardware, or may be implemented by hardware executing corresponding software. The hardware or the software includes one or more modules corresponding to the functions. For example, the transceiver unit 162 may include a sending unit and a receiving unit. The sending unit may be configured to implement operations and/or procedures corresponding to a sending action performed by the transceiver unit. The receiving unit may be configured to implement operations and/or procedures corresponding to a receiving action performed by the transceiver unit. The sending unit may be replaced by a transmitter, and the receiving unit may be replaced by a receiver, to respectively perform sending and receiving operations and related processing operations in the method embodiments.

In an embodiment of the application, the apparatus 160 in FIG. 16 may alternatively be a chip or a chip system, for example, a system on chip (SoC). Correspondingly, the transceiver unit 162 may be a transceiver circuit of the chip. This is not limited herein.

Figure 17:
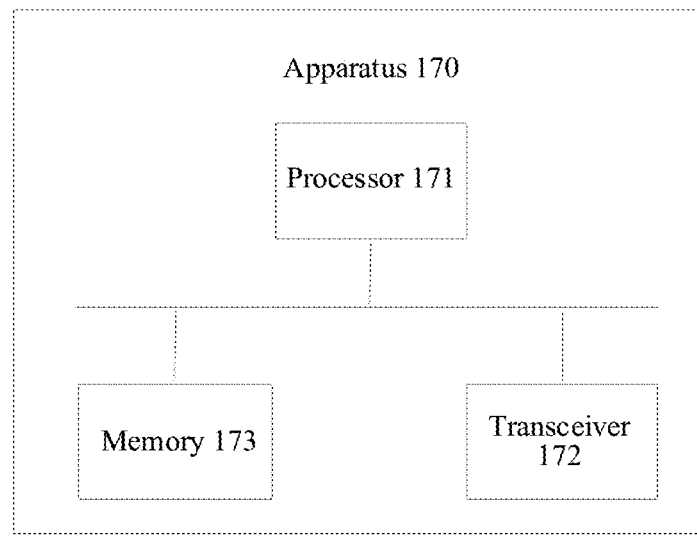
FIG. 17 shows another HARQ-based communication apparatus 170 according to an embodiment of the application.

FIG. 17 shows another HARQ-based communication apparatus 170 according to an embodiment of this application. The apparatus 170 includes a processor 171, a transceiver 172, and a memory 173. The processor 171, the transceiver 172, and the memory 173 communicate with each other through an internal connection path. The memory 173 is configured to store instructions. The processor 171 is configured to execute the instructions stored in the memory 173, to control the transceiver 172 to send a signal and/or receive a signal. In an embodiment, the processor 171 and the memory 173 may be integrated together.

In an embodiment, the apparatus 170 is configured to perform procedures and operations corresponding to the transmit end in the foregoing HARQ-based communication method.

The processor 171 is configured to obtain a plurality of information bits in first transmission; group the plurality of information bits into m groups of first information bit sequences $K_1, \ldots, K_m$, where m is a positive integer; perform first encoding on the m groups of first information bit sequences to obtain m groups of first encoded codewords; and perform second encoding on the m groups of first encoded codewords to obtain a first target encoded codeword.

The transceiver 172 is configured to send the first target encoded codeword to a receive end.

The processor 171 is further configured to perform interleaving processing on n groups of first information bit sequences in the m groups of first information bit sequences in $t^{th}$ retransmission if the first transmission fails, to obtain m groups of first bit sequences $X_1, \ldots, X_m$, where n is less than m; t is greater than or equal to 1; and the m groups of first bit sequences include n groups of interleaved bit sequences; perform the first encoding on the m groups of first bit sequences to obtain m groups of second encoded codewords; and perform the second encoding on the m groups of second encoded codewords to obtain a second target encoded codeword.

The transceiver 172 is further configured to send the second target encoded codeword to the receive end.

In an embodiment, the apparatus 170 is configured to perform procedures and operations corresponding to the receive end in the foregoing HARQ-based communication method.

The transceiver 172 is configured to receive first to-be-decoded information in first transmission from a transmit end.

The processor 171 is configured to determine first soft information based on the first to-be-decoded information.

The transceiver 172 is further configured to receive second to-be-decoded information in $t^{th}$ retransmission from the transmit end if the first transmission fails.

The processor 171 is further configured to determine second soft information based on the second to-be-decoded information.

The processor 171 is further configured to perform decoding processing on the first soft information and the second soft information through a cancellation operation and an AND operation based on an interleaving pattern. The first to-be-decoded information is related to a first target encoded codeword of the transmit end; the second to-be-decoded information is related to the second target encoded codeword of the transmit end; the first target encoded codeword is obtained by performing encoding processing on m groups of first information bit sequences; the second target encoded codeword is obtained by performing encoding processing on m groups of first bit sequences; the m groups of first bit sequences are obtained by performing interleaving processing on n groups of first information bits in the m groups of first information bit sequences; and n is less than m.

It should be understood that the apparatus 170 may be the transmit end or the receive end in the foregoing embodiments, and may be configured to perform operations and/or procedures corresponding to the transmit end or the receive end in the foregoing method embodiments. In an embodiment, the memory 173 may include a read-only memory and a random access memory, and provide instructions and data to the processor. A part of the memory may further include a non-volatile random access memory. For example, the memory may further store information of a device type. The processor 171 may be configured to execute the instructions stored in the memory. When the processor 171 executes the instructions stored in the memory, the processor 171 is configured to perform the operations and/or procedures in the foregoing method embodiments corresponding to the transmit end or the receive end. The transceiver 172 may include a transmitter and a receiver. The transmitter may be configured to implement operations and/or procedures corresponding to a sending action performed by the transceiver. The receiver may be configured to implement operations and/or procedures corresponding to a receiving action performed by the transceiver.

It should be understood that in embodiments of this application, the processor of the foregoing apparatus may be a central processing unit (CPU), or the processor may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

In an implementation process, operations in the foregoing method may be implemented by using a hardware integrated logic circuit in the processor, or by using instructions in a form of software. The operations of the method disclosed with reference to embodiments of this application may be directly performed by a hardware processor, or may be performed by using a combination of hardware and software units in the processor. A software unit may be located in a mature storage medium in the art, such as a random access memory, a flash memory, a read-only memory, a programmable read-only memory, an electrically erasable programmable memory, or a register. The storage medium is located in the memory. The processor executes instructions in the memory and completes the operations in the foregoing method in combination with hardware of the processor. To avoid repetition, details are not described herein again.

One of ordinary skilled in the art may be aware that, in combination with the examples described in the embodiments disclosed in this specification, units and algorithm operations can be implemented by electronic hardware or a combination of computer software and electronic hardware. Whether the functions are performed by hardware or software depends on particular applications and design constraint conditions of the technical solutions. One of ordinary skilled in the art may use different methods to implement the described functions for each particular application, but it should not be considered that the implementation goes beyond the scope of this application.

This application further provides a communication apparatus at a transmit end, including a communication interface and a logic circuit. The logic circuit is configured to perform interleaving processing on n groups of first information bit sequences in m groups of first information bit sequences. The communication interface is configured to send a first target encoded codeword and a second target encoded codeword.

This application further provides a communication apparatus at a receive end, including a communication interface and a logic circuit. The communication interface is configured to receive first to-be-decoded information and second to-be-decoded information. The logic circuit is configured to perform decoding processing on the first to-be-decoded information and the second to-be-decoded information through a cancellation operation and an AND operation based on an interleaving pattern.

An embodiment of this application further provides a communication system. The communication system may include the transmit end shown in FIG. 16 or FIG. 17 (where the apparatus 160 or the apparatus 170 is embodied as the transmit end), and the receive end shown in FIG. 16 or FIG. 17 (where the apparatus 160 or the apparatus 170 is embodied as the receive end).

It may be clearly understood by one of ordinary skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division of the units is merely logical function division and may be other division in actual implementation. For example, a plurality of units or components may be combined or integrated into another system, or some features may be omitted or not be performed. In addition, the displayed or discussed mutual couplings or direct couplings or communication connections may be implemented through some interfaces, and the indirect couplings or communication connections of the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, the functional units in embodiments of this application may be integrated into one processing unit, or each of the units may exist alone physically, or two or more units are integrated into one unit.

If the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the method described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely In an embodiment implementations of this application, but are not intended to limit the protection scope of this application. Any variation or replacement readily figured out by one of ordinary skilled in the art within the technical scope disclosed in this application shall fall within the protection scope of this application. Therefore, the protection scope of this application shall be subject to the protection scope of the claims.

What is claimed is:

1. A hybrid automatic repeat request (HARQ)-based communication method, comprising:
   obtaining a plurality of information bits in first transmission;

grouping the plurality of information bits into m groups of first information bit sequences $K_1, \ldots, K_m$, wherein m is a positive integer;

performing first encoding on the m groups of first information bit sequences to obtain m groups of first encoded codewords;

performing second encoding on the m groups of first encoded codewords to obtain a first target encoded codeword;

sending the first target encoded codeword to a receive end;

performing interleaving processing on n groups of first information bit sequences in the m groups of first information bit sequences in $t^{th}$ retransmission if the first transmission fails, to obtain m groups of first bit sequences $X_1, \ldots, X_m$, wherein n is less than m; t is greater than or equal to 1; and the m groups of first bit sequences comprise n groups of interleaved bit sequences, wherein the interleaving processing is performed in a retransmission process, and subsequent encoding and decoding operations are performed on interleaved sequences, wherein the decoding operations include a cancellation operation and an AND operation based on an interleaving pattern, a same interleaving pattern is implemented by using a same interleaver, different interleaving patterns are implemented by using different interleavers, wherein the interleaving processing improves code weight distribution in transmission;

performing the first encoding on the m groups of first bit sequences to obtain m groups of second encoded codewords;

performing the second encoding on the m groups of second encoded codewords to obtain a second target encoded codeword; and sending the second target encoded codeword to the receive end.

2. The method according to claim 1, wherein the n groups of first information bit sequences comprise: n groups of information bit sequences corresponding to layers whose reliability ranks low in the m groups of first information bit sequences, wherein the reliability ranks in descending order.

3. The method according to claim 1, wherein an interleaving pattern of $X_m$ in the $t^{th}$ retransmission is different from an interleaving pattern of $X_m$ in $(t+1)^{th}$ retransmission.

4. The method according to claim 1, further comprising:
performing interleaving processing on s groups of first information bit sequences in the m groups of first information bit sequences in the $(t+1)^{th}$ retransmission if the $t^{th}$ retransmission fails, to obtain m groups of second bit sequences, wherein s is less than m; and the m groups of second bit sequences comprise s groups of interleaved bit sequences;

performing the first encoding on the m groups of second bit sequences to obtain m groups of third encoded codewords;

performing the second encoding on the m groups of third encoded codewords to obtain a third target encoded codeword; and sending the third target encoded codeword to the receive end.

5. The method according to claim 4, wherein when interleaving is performed on the n groups of first information bit sequences at a same location in the $t^{th}$ retransmission and the $(t+1)^{th}$ retransmission, an interleaving pattern for performing interleaving processing on the first information bit sequence at the same location in the $t^{th}$ retransmission is different from an interleaving pattern for performing interleaving processing on the first information bit sequence at the same location in the $(t+1)^{th}$ retransmission.

6. The method according to claim 4, wherein when interleaving is performed on the n groups of first information bit sequences at different locations in the $t^{th}$ retransmission and the $(t+1)^{th}$ retransmission, an interleaving pattern for performing interleaving processing on the first information bit sequence at one of the different locations in the $t^{th}$ retransmission is the same as or different from an interleaving pattern for performing interleaving processing on the first information bit sequence at the other of the different locations in the $(t+1)^{th}$ retransmission.

7. A hybrid automatic repeat request (HARQ)-based communication method, comprising:
receiving, by a receive end, first information in first transmission from a transmit end;

determining first soft information based on the first information;

receiving, by the receive end, second information in $t^{th}$ retransmission from the transmit end if the first transmission fails;

determining second soft information based on the second information; and performing, by the receive end, decoding processing on the first soft information and the second soft information through a cancellation operation and an AND operation based on an interleaving pattern, wherein a same interleaving pattern is implemented by using a same interleaver, and wherein different interleaving patterns are implemented by using different interleavers, wherein the first information is related to a first target encoded codeword of the transmit end; the second information is related to a second target encoded codeword of the transmit end; the first target encoded codeword is obtained by performing encoding processing on m groups of first information bit sequences; the second target encoded codeword is obtained by performing encoding processing on m groups of first bit sequences; the m groups of first bit sequences are obtained by performing interleaving processing on n groups of first information bit sequences in the m groups of first information bit sequences; and n is less than m, wherein the interleaving processing is performed in a retransmission process, and subsequent encoding and decoding operations are performed on interleaved sequences, wherein the interleaving processing improves code weight distribution in transmission.

8. The method according to claim 7, wherein n groups of first information bit sequences comprise: n groups of information bit sequences corresponding to layers whose reliability ranks low in the m groups of first information bit sequences, wherein the reliability ranks in descending order.

9. The method according to claim 7, wherein when interleaving is performed on the n groups of first information bit sequences at a same location in the $t^{th}$ retransmission and $(t+1)^{th}$ retransmission, an interleaving pattern for performing interleaving processing on the first information bit sequence at the same location in the $t^{th}$ retransmission is different from an interleaving pattern for performing interleaving processing on the first information bit sequence at the same location in the $(t+1)^{th}$ retransmission.

10. The method according to claim 7, wherein when interleaving is performed on the n groups of first information bit sequences at different locations in the $t^{th}$ retransmission and $(t+1)^{th}$ retransmission, an interleaving pattern for performing interleaving processing on the first information bit sequence at one of the different locations in the $t^{th}$ retransmission is the same as or different from an interleaving pattern for performing interleaving processing on the first information bit sequence at the other of the different locations in the $(t+1)^{th}$ retransmission.

11. A hybrid automatic repeat request (HARQ)-based communication apparatus, comprising:
   a transceiver, configured to
      receive first information in first transmission from a transmit end, and
      receive second information in $t^{th}$ retransmission from the transmit end if the first transmission fails; and
   a processor, configured to
      determine first soft information based on the first information,
      determine second soft information based on the second information, and
      perform decoding processing on the first soft information and the second soft information through a cancellation operation and an AND operation based on an interleaving pattern, wherein a same interleaving pattern is implemented by using a same interleaver, and wherein different interleaving patterns are implemented by using different interleavers, wherein the first information is related to a first target encoded codeword of the transmit end; the second information is related to a second target encoded codeword of the transmit end; the first target encoded codeword is obtained by performing encoding processing on m groups of first information bit sequences; the second target encoded codeword is obtained by performing encoding processing on m groups of first bit sequences; the m groups of first bit sequences are obtained by performing interleaving processing on n groups of first information bit sequences in the m groups of first information bit sequences; and n is less than m, wherein the interleaving processing is performed in a retransmission process, and subsequent encoding and decoding operations are performed on interleaved sequences, wherein the interleaving processing improves code weight distribution in transmission.

12. The apparatus according to claim 11, wherein n groups of first information bit sequences comprise: n groups of information bit sequences corresponding to layers whose reliability ranks low in the m groups of first information bit sequences, wherein the reliability ranks in descending order.

13. The apparatus according to claim 11, wherein when interleaving is performed on the n groups of first information bit sequences at a same location in the $t^{th}$ retransmission and $(t+1)^{th}$ retransmission, an interleaving pattern for performing interleaving processing on the first information bit sequence at the same location in the $t^{th}$ retransmission is different from an interleaving pattern for performing interleaving processing on the first information bit sequence at the same location in the $(t+1)^{th}$ retransmission.

14. The apparatus according to claim 11, wherein when interleaving is performed on the n groups of first information bit sequences at different locations in the $t^{th}$ retransmission and $(t+1)^{th}$ retransmission, an interleaving pattern for performing interleaving processing on the first information bit sequence at one of the different locations in the $t^{th}$ retransmission is the same as or different from an interleaving pattern for performing interleaving processing on the first information bit sequence at the other of the different locations in the $(t+1)^{th}$ retransmission.

15. A hybrid automatic repeat request (HARQ)-based communication apparatus, comprising: at least one processor, configured to call a program in a memory, to perform the method according to claim 1.

16. A hybrid automatic repeat request (HARQ)-based communication apparatus, comprising: at least one processor and an interface circuit, wherein the interface circuit is configured to provide information input and/or information output for the at least one processor, and the at least one processor is configured to perform the method according to claim 1.

17. A chip, comprising at least one processor and an interface, wherein
   the interface is configured to provide program instructions or data for the at least one processor; and
   the at least one processor is configured to execute the program instructions, to implement the method according to claim 1.

18. A non-transitory computer-readable storage medium, wherein the computer-readable storage medium stores instructions, and when the instructions are executed, a computer is enabled to perform the method according to claim 1.

19. A communication apparatus, comprising: a communication interface and a logic circuit, wherein the logic circuit is configured to perform interleaving processing on n groups of first information bit sequences in m groups of first information bit sequences, and the communication interface is configured to send the first target encoded codeword and the second target encoded codeword, so that the communication apparatus performs the method according to claim 1.

20. A communication apparatus, comprising: a communication interface and a logic circuit, wherein the communication interface is configured to receive the first information and the second information, and the logic circuit is configured to perform decoding processing on the first information and the second information through the cancellation operation and an AND operation based on an interleaving pattern, so that the communication apparatus performs the method according to claim 7.

* * * * *